(12) United States Patent
Han

(10) Patent No.: US 11,112,792 B2
(45) Date of Patent: Sep. 7, 2021

(54) CLEANING ROBOT AND METHOD FOR CONTROLLING CLEANING ROBOT

(71) Applicant: Samsung Electronics Co., Ltd., Suwon-si (KR)

(72) Inventor: Seong Joo Han, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 240 days.

(21) Appl. No.: 16/061,262

(22) PCT Filed: Dec. 28, 2016

(86) PCT No.: PCT/KR2016/015379
§ 371 (c)(1),
(2) Date: Jun. 11, 2018

(87) PCT Pub. No.: WO2017/116131
PCT Pub. Date: Jul. 6, 2017

(65) Prior Publication Data
US 2018/0373242 A1 Dec. 27, 2018

(30) Foreign Application Priority Data

Dec. 28, 2015 (KR) .................. 10-2015-0187427
Mar. 4, 2016 (KR) .................. 10-2016-0026295

(51) Int. Cl.
G05D 1/00 (2006.01)
A47L 9/28 (2006.01)
A47L 9/00 (2006.01)
A47L 11/40 (2006.01)

(52) U.S. Cl.
CPC ............ *G05D 1/0044* (2013.01); *A47L 9/009* (2013.01); *A47L 9/2805* (2013.01); *A47L 9/2826* (2013.01); *A47L 9/2842* (2013.01); *A47L 9/2847* (2013.01); *A47L 9/2852* (2013.01); *A47L 9/2857* (2013.01); *A47L 9/2889* (2013.01); *A47L 9/2894* (2013.01); *A47L 11/4011* (2013.01);
(Continued)

(58) Field of Classification Search
USPC .................................. 700/245–264
See application file for complete search history.

(56) References Cited

U.S. PATENT DOCUMENTS 9,529,363 B2 * 12/2016 Chiappetta ........... G05D 1/0225
2004/0199301 A1 * 10/2004 Woo ..................... G05D 1/0225
701/1
2006/0111811 A1 5/2006 Okamoto et al.
(Continued)

FOREIGN PATENT DOCUMENTS

KR 10-2002-0081510 A 10/2002
KR 10-2013-0030958 A 3/2013
(Continued)

OTHER PUBLICATIONS

European Patent Office, "Communication pursuant to Article 94(3) EPC," Application No. EP16882083.5, dated Jul. 9, 2019, 4 pages.
(Continued)

*Primary Examiner* — Jonathan L Sample

(57) ABSTRACT

A cleaning robot includes a user interface to display a map image including one or more divided regions, and the user interface displays an icon corresponding to a state value of a main device on the map image.

14 Claims, 32 Drawing Sheets

(52) U.S. Cl.
CPC ....... *A47L 2201/00* (2013.01); *A47L 2201/04* (2013.01); *A47L 2201/06* (2013.01); *G05D 2201/0215* (2013.01)

(56) References Cited

U.S. PATENT DOCUMENTS

| | | | | |
|---|---|---|---|---|
| 2007/0192910 | A1 | 8/2007 | Vu et al. | |
| 2008/0082208 | A1* | 4/2008 | Hong | G05D 1/0033 700/245 |
| 2010/0324731 | A1* | 12/2010 | Letsky | G05D 1/0274 700/245 |
| 2012/0265391 | A1* | 10/2012 | Letsky | G05D 1/0088 701/25 |
| 2013/0024025 | A1* | 1/2013 | Hsu | G05D 1/0274 700/259 |
| 2013/0056032 | A1* | 3/2013 | Choe | G05D 1/0044 134/18 |
| 2013/0326839 | A1* | 12/2013 | Cho | G05D 1/0274 15/319 |
| 2014/0116469 | A1* | 5/2014 | Kim | G05D 1/0022 134/18 |
| 2014/0207281 | A1* | 7/2014 | Angle | H04L 12/282 700/257 |
| 2014/0316636 | A1* | 10/2014 | Hong | G05D 1/0016 701/27 |
| 2015/0190925 | A1 | 7/2015 | Hoffman et al. | |
| 2016/0027207 | A1* | 1/2016 | Hillen | G06T 17/00 348/207.1 |
| 2016/0100733 | A1* | 4/2016 | Kim | A47L 9/1683 15/319 |

FOREIGN PATENT DOCUMENTS

| | | |
|---|---|---|
| KR | 10-1263233 B1 | 5/2013 |
| KR | 10-2013-0092729 A | 8/2013 |
| KR | 10-1378883 B1 | 3/2014 |
| KR | 10-2015-0028152 A | 3/2015 |

OTHER PUBLICATIONS

Supplementary European Search Report dated Oct. 24, 2018 in connection with European Patent Application No. 16 88 2083, 7 pages.
ISA/KR, "International Search Report and Written Opinion of the International Searching Authority," International Application No. PCT/KR2016/015379, dated Apr. 19, 2017, 13 pages.
Non-final Office Action dated Sep. 30, 2020 in connection with U.S. Appl. No. 16/947,058, 18 pages.
Invitation pursuant to Rule 63(1) EPC dated Dec. 2, 2020 in connection with European Application No. 20186615.9, 4 pages.

* cited by examiner

CLEANING ROBOT AND METHOD FOR CONTROLLING CLEANING ROBOT

CROSS-REFERENCE TO RELATED APPLICATIONS AND CLAIM OF PRIORITY

This application is a 371 National Stage of International Application No. PCT/KR2016/015379, filed Dec. 28, 2016, which claims priority to Korean Patent Application No. 10-2015-0187427, filed Dec. 28, 2015 and Korean Patent Application No. 10-2016-0026295, filed Mar. 4, 2016, the disclosures of which are herein incorporated by reference in their entirety.

BACKGROUND

1. Field

The present disclosure relates to a cleaning robot and a method of controlling the same.

2. Description of Related Art

A cleaning robot is an apparatus that automatically cleans a space to be cleaned by suctioning foreign substances such as dust accumulated on a floor while traveling the space to be cleaned without a user's manipulation. That is, the cleaning robot cleans the space to be cleaned while traveling the space to be cleaned.

Conventionally, a cleaning robot performs a traveling function and a cleaning function in a region to be cleaned in accordance with the user command. However, since the cleaning robot directly moves or performs cleaning from merely receiving the user command, it is not possible for the user to check a state of the cleaning robot.

Conventionally, in a case in which a user wishes a specific position within a space to be cleaned to be cleaned first, the user has to directly check a position of a cleaning robot and move the cleaning robot to the specific position using a remote controller.

SUMMARY

It is an aspect of the present disclosure to provide a cleaning robot capable of intuitively displaying a state of a cleaning robot and changes in the state thereof, and a method of controlling the cleaning robot.

It is another aspect of the present disclosure to provide a cleaning robot capable of providing a user interface (UI) corresponding to a user command, and a method of controlling the cleaning robot.

It is still another aspect of the present disclosure to provide a cleaning robot capable of, in a divided region of an actual space to be cleaned that corresponds to a divided region of a virtual space to be cleaned that is selected by a user, completely cleaning an empty space within the divided region even when variations occur in the arrangement of obstacles within the divided region, and a method of controlling the cleaning robot.

In accordance with one aspect of the present disclosure, a cleaning robot includes a user interface to display a map image including one or more divided regions, and the user interface displays an icon corresponding to a state value of a main device on the map image.

The state value may include any one of a first state value which indicates that the main device is performing cleaning, a second state value which indicates that the main device has completed cleaning, and a third state value which indicates that an error has occurred.

The cleaning robot may further include a controller to control the main device to travel or perform cleaning, and the user interface may receive a user command; and the controller may control the main device on the basis of the user command.

The user interface may receive a command to designate at least one divided region, and may change an outline display attribute of the at least one designated divided region.

In a case in which the user interface may receive the command to designate at least one divided region, the user interface may change an outline color or an outline thickness of the at least one designated divided region.

In a case in which the main device is traveling, the user interface displays a translucent layer over the map image.

In a case in which the main device is traveling, the user interface may display an animation which indicates that the main device is traveling.

The user interface may further display a message corresponding to the state value of the main device.

The user interface may receive a command to designate at least one divided region and may change a name display attribute of the at least one designated divided region.

The cleaning robot may further include a controller to set a target point within the divided region, set a virtual wall on the map image, and control the main device to perform cleaning from the target point.

The cleaning robot may further include a storage unit to store the map image, and a controller to set a target point within the divided region, set a virtual wall on the map image, and control the main device to perform cleaning from the target point.

The storage unit may include information on a region dividing point corresponding to each divided region, and the controller may set the virtual wall at the region dividing point.

The cleaning robot may further include a driving wheel driver to control driving of a wheel and a main brush driver to control driving of a main brush unit, and the controller may control the driving wheel driver to allow the main device to move to the target point, and control the main brush driver to perform cleaning from the target point.

The cleaning robot may further include a main device sensor unit, and the main device sensor unit may match a position of the main device with the map image based on position information generated by the main device sensor unit.

The user interface may receive a selection of the divided region from a user; and the controller may set the target point within the divided region selected by the user.

The controller may set at least one of a central point of a divided region, a point farthest from surrounding obstacles within the divided region, and another point that is present within the divided region selected by the user from the map image and the closest to the current position of the main device as the target point.

The controller may set a virtual region on the map image.

The user interface may receive a command to designate a virtual region form the user.

The controller may control the main device to perform cleaning within the virtual region.

The controller may control the main device to perform cleaning outside the virtual region.

The user interface may receive a selection about whether the main device perform cleaning within the virtual region or the outside the virtual region from the user.

The virtual area may include a space in a virtual wall forming a closed loop.

The controller may set a movement path from the current position of the main device to the target point, and move the main device along the movement path.

The controller may set the virtual wall when the main device is located at the target point.

The controller may control the main device to perform autonomous traveling from the target point, and restrict entry of the main device into the virtual wall.

The controller may set a cleaning order for at least one of the divided regions, and move, when the main device completes cleaning for one of the divided areas, the main device to a next divided area When the main device completes cleaning for the one of the divided areas, the controller may remove the virtual wall and move the main device to the next divided area.

The controller may set the target point of the next divided area and move the main device to the target point of the next divided area.

In accordance with another aspect of the present disclosure, a method of controlling a cleaning robot includes displaying a map image including one or more divided regions; and displaying an icon corresponding to a state value of a main device on the map image.

The method may further include setting a target point within the divided region; setting a virtual wall on the map image; and performing cleaning from the target point.

According to the above-described cleaning robot and method of controlling the cleaning robot, since a user can intuitively recognize a state of the cleaning robot or changes in the state thereof from a map image, an error in the user's recognition of the state of the cleaning robot can be reduced.

Further, according to the above-described cleaning robot and method of controlling the cleaning robot, by a user recognizing a state of the cleaning robot from a map image, the user can control the cleaning robot in various ways through a user interface (UI) on the basis of state information of the cleaning robot.

Further, according to the above-described cleaning robot and method of controlling the cleaning robot, by a virtual wall being set around a divided region selected from a map image, a main device can be blocked from entering a space outside the virtual wall.

Further, according to the above-described cleaning robot and method of controlling the cleaning robot, by a target point of a main device being set within a divided region selected from a map image and cleaning being started after the main device is first moved to the set target point, a user can complete cleaning in an actual region intended by the user even in a case in which the divided region displayed on the map image does not exactly correspond to the actual area.

DETAILED DESCRIPTION

Figure 1:
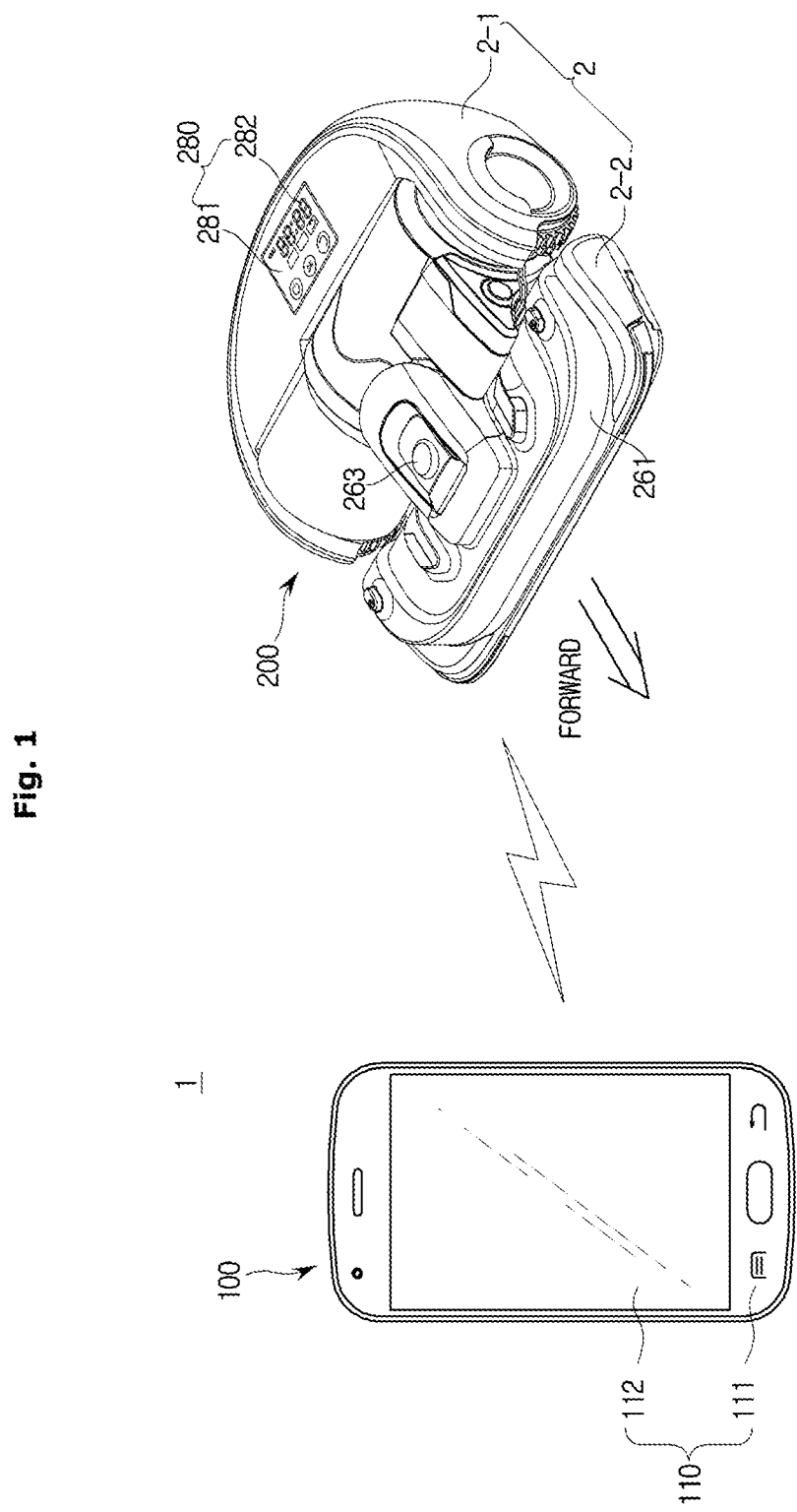
FIG. 1 is an exterior view of a cleaning robot.

Hereinafter, the present disclosure will be described in detail using embodiments, which will be described with reference to the accompanying drawings, for those of ordinary skill in the art to easily understand and practice the disclosure. However, in describing the present disclosure, when it is judged that detailed descriptions on a known function or configuration related to the disclosure might unnecessarily blur the gist of the embodiments of the disclosure, the detailed descriptions thereof will be omitted.

The terms used below are terms selected in consideration of functions in the embodiments, and meanings of the terms may vary in accordance with an intention, practice, or the like of a user or an operator. Thus, in a case in which the terms used in the embodiments, which will be described below, are specifically defined below, the terms should be interpreted as having the specifically-defined meanings, and in a case in which the terms are not specifically defined below, the terms should be interpreted as having meanings generally understood by those of ordinary skill in the art.

Further, even when configurations of aspects or embodiments selectively described below are illustrated as a single integrated configuration in the drawings, it should be understood that the configurations may be freely combined with each other when it is not clear to those of ordinary skill in the art that such combinations are technically contradictory, unless described otherwise.

Hereinafter, embodiments of a cleaning robot and a method of controlling the cleaning robot will be described with reference to the accompanying drawings.

Hereinafter, a configuration of a cleaning robot according to one embodiment will be described with reference to FIG. 1.

Figure 2A:
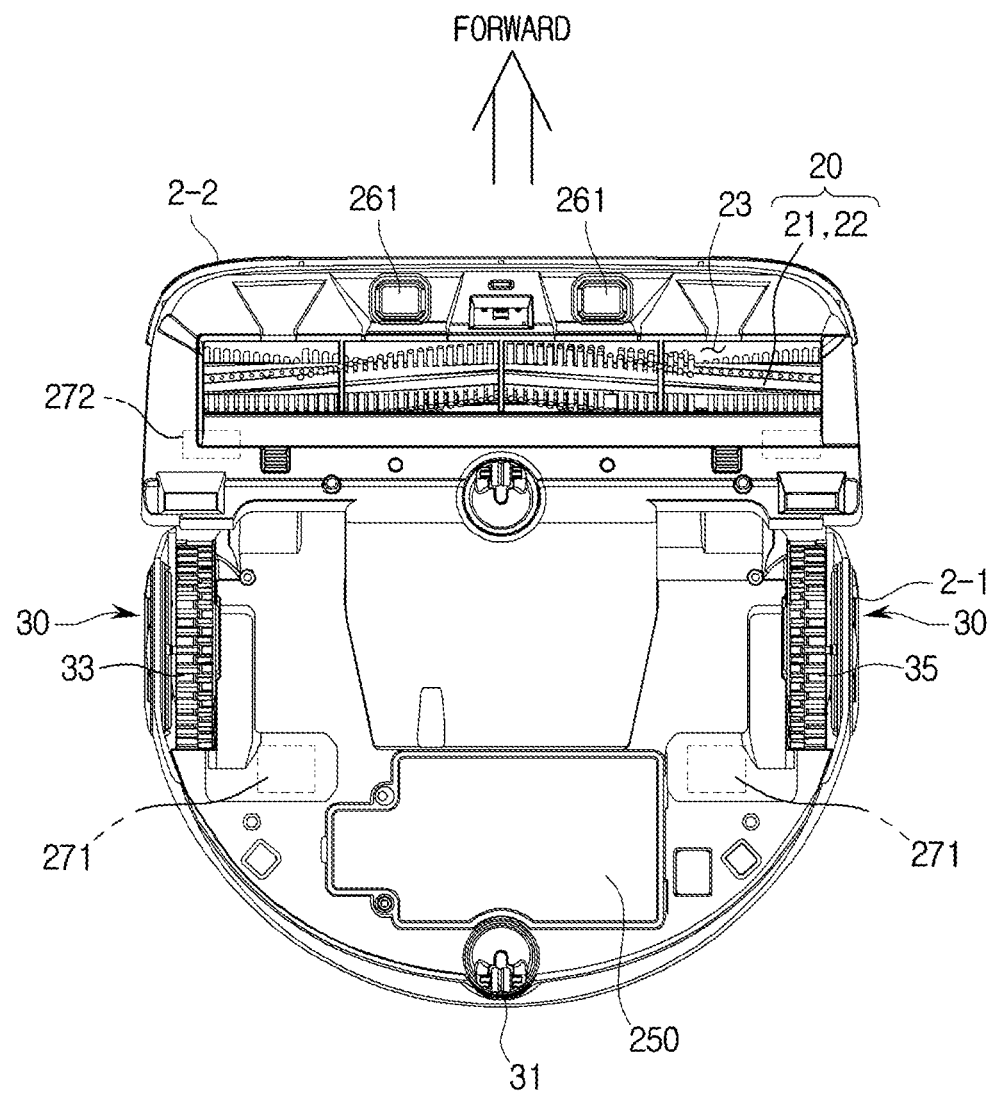
FIG. 2A is a bottom view of a main device according to one embodiment.
Figure 2B:
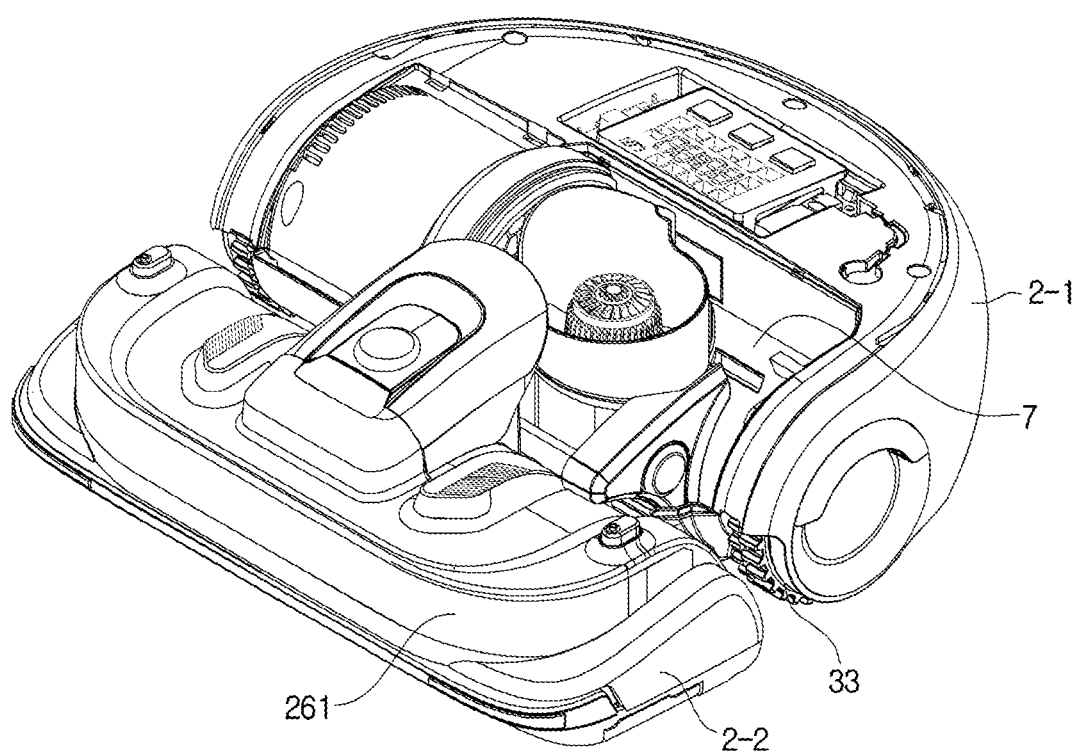
FIG. 2B is an interior view of the main device according to one embodiment.

FIG. 1 is an exterior view of a cleaning robot, FIG. 2A is a bottom view of a main device according to one embodiment, and FIG. 2B is an interior view of the main device according to one embodiment.

Referring to FIG. 1, a cleaning robot 1 performs cleaning or moves at least one time, generates a map including obstacle information of a space in which the cleaning robot 1 is currently present, generates a map image that is similar to the generated map, and displays the map image on a user interface (UI.) Here, "map" refers to spatial image information generated by the cleaning robot 1 on the basis of sensed values prior to structural analysis, and "map image" refers to spatial image information including structural information generated by the cleaning robot 1 as a result of the structural analysis. By the generation of the map image, a virtual space to be cleaned which matches an actual space to be cleaned in which the cleaning robot 1 is present may be provided to a user.

Specifically, the cleaning robot 1 may grasp the obstacle information of the space in which the cleaning robot 1 is currently present through a sensor unit by performing cleaning or moving at least one time in the space in which the cleaning robot 1 is currently present. The cleaning robot 1 may generate a map including the obstacle information of the space in which the cleaning robot 1 is currently present on the basis of the grasped obstacle information. The cleaning robot 1 may analyze a structure of the map including the obstacle information, and divide the space grasped through performing cleaning or moving at least one time into a plurality of divided regions on the basis of the analyzed structure.

The cleaning robot 1 may substitute the plurality of divided regions with preset figures and generate a map image in which the plurality of preset figures are combined to have different areas or positions.

The cleaning robot 1 may generate a map image that substitutes for the map on the basis of a plan view that corresponds to the analyzed structure among pieces of pre-stored plan view data. The cleaning robot 1 may display the generated map image on the UI for the user to easily grasp the structure of the space in which the cleaning robot 1 is currently present and the position of the cleaning robot 1.

The cleaning robot 1 may include a main device 200 configured to perform cleaning while moving on a space to be cleaned, and a remote device 100 configured to control the operation of the main device 200 from a remote distance and display a current situation or the like of the main device 200. Although a mobile phone may be employed as the remote device 100 as illustrated in FIG. 1, the remote device 100 is not limited thereto, and various hand-held devices other than a mobile phone such as a personal digital assistant (PDA), a laptop, a digital camera, an MP3 player, and a remote controller may also be employed as the remote device 100.

The remote device 100 may include a remote device UI 110 configured to provide the UI. The remote device UI 110 may include a remote device input unit 111 and a remote device display unit 112. The remote device UI 110 may receive a user command for control of the main device 200 or display various pieces of information of the main device 200.

The remote device input unit 111 may include hardware devices such as various buttons or switches, a pedal, a keyboard, a mouse, a track-ball, various levers, a handle, or a stick for a user input. The remote device input unit 111 may also include a graphical UI (GUI) such as a touch pad, i.e., a software device, for a user input. The touch pad may be implemented as a touchscreen panel (TSP) and form a layered structure with the remote device display unit 112.

A cathode ray tube (CRT), a digital light processing (DLP) panel, a plasma display panel, a liquid crystal display (LCD) panel, an electro-luminescence (EL) panel, an electrophoretic display (EPD) panel, an electrochromic display (ECD) panel, a light emitting diode (LED) panel, an organic LED (OLED) panel, or the like may be provided as the remote device display unit 112, but the remote device display unit 112 is not limited thereto.

In a case in which the remote device display unit 112 is configured as a TSP that forms a layered structure with the touch pad as described above, the remote device display unit 112 may also be used as an input unit in addition to being used as a display unit. Hereinafter, for convenience of descriptions, descriptions will be given by assuming that the remote device display unit 112 is configured as a TSP.

As illustrated in FIGS. 1 to 2B, the main device 200 may include a body 2 including a main body 2-1 and a sub-body 2-2, a driving wheel assembly 30, a main brush unit 20, a power supply unit 250, a dust collector, a main device communication unit 220, and a user interface unit 210. As illustrated in FIG. 1, the main body 2-1 may have a substantially semicircular shape, and the sub-body 2-2 may have a rectangular parallelepiped shape. Exteriors of the remote device 100 and the main device 200 are merely examples of an exterior of the cleaning robot 1, and the cleaning robot 1 may have various shapes.

The main device power supply unit 250 supplies driving power for driving the main device 200. The main device power supply unit 250 includes a battery that is electrically connected to driving devices for driving various components mounted on the body 2 and configured to supply the driving power. The battery may be provided as a rechargeable secondary battery and may be charged by receiving electric power from a docking station. Here, the docking station is a device at which the main device 200 is docked when the main device 200 has completed a cleaning process or when a residual amount of the battery is lower than a reference value. The docking station may supply electric power to the docked main device 200 using an external or internal power supply.

The main device power supply unit 250 may be mounted at the bottom of the body 2 as illustrated in FIGS. 2A and 2B, but embodiments are not limited thereto.

Although not illustrated, the main device communication unit 220 may be disposed inside the body 2 and allow the body 2 to communicate with the docking station, a virtual guard, the remote device 100, and the like. The main device communication unit 220 may transmit whether the main device 200 has completed cleaning, a residual amount of battery provided in the body 2, a position of the body 2, and the like to the docking station, and receive a position of the docking station and a docking signal that guides docking of the main device 200 from the docking station.

The main device communication unit 220 may transmit and receive an entry restriction signal to and from a virtual guard configured to form a virtual wall. The virtual guard is an external device configured to transmit an entry restriction signal to a connected path between any divided region and a specific divided region when the main device 200 is traveling. The virtual guard forms the virtual wall. For example, the virtual guard may sense entry of the main device 200 into the specific divided region using an infrared sensor, a magnetic sensor, or the like, and transmit an entry restriction signal to the main device communication unit 220 via a wireless communication network. Here, "region to be cleaned" refers to an entire region on which the main device 200 may travel that includes a plurality of divided regions.

In this case, the main device communication unit 220 may receive an entry restriction signal and block the main device 200 from entering a specific region.

The main device communication unit 220 may receive a command input by a user via the remote device 100. For example, the user may input a cleaning start/end command, a cleaning region map generation command, a main device 200 moving command, and the like via the remote device 100, and the main device communication unit 220 may receive a user command from the remote device 100 and allow the main device 200 to perform an operation corresponding to the received user command. The main device communication unit 220 will be described in further detail below.

A plurality of driving wheel assemblies 30 may be present. As illustrated in FIGS. 2A and 2B, two driving wheel assemblies 30 may be provided at left and right edges to be symmetrical to each other from the center of the bottom of the body 2. The driving wheel assemblies 30 respectively include driving wheels 33 and 35 that allow moving operations such as moving forward, moving backward, and rotating during a process of performing cleaning. The driving wheel assemblies 30 may be modularized and be detachably mounted on the bottom of the body 2. Therefore, in a case in which a failure occurs in the driving wheels 33 and 35 and repairing is required, only the driving wheel assemblies 30 may be separated from the bottom of the body 2 for repair without disassembling the entire body 2. The driving wheel assemblies 30 may be mounted on the bottom of the body 2 by methods such as hook coupling, screw coupling, and fitting.

A castor 31 is provided at a front edge from the center of the bottom of the body 2 to allow the body 2 to maintain a stable posture. The castor 31 may also constitute a single assembly like the driving wheel assemblies 30.

The main brush unit 20 is mounted at a side of a suction hole 23 formed at the bottom of the body 2. The main brush unit 20 includes a main brush 21 and a roller 22. The main brush 21 is disposed at an outer surface of the roller 22 and whirls dust accumulated on a floor surface in accordance with rotation of the roller 22 to guide the dust to the suction hole 23. In this case, the main brush 21 may be formed with various materials having an elastic force. The roller 22 may be formed of a rigid body, but embodiments are not limited thereto.

Although not illustrated in the drawings, a blower device configured to generate a suction force may be provided inside the suction hole 23, and the blower device may move the dust introduced into the suction hole 23 to the dust collector configured to collect and filter the dust.

Various sensors may be mounted on the body 2. The various sensors may include at least one of an obstacle sensor 261 and an image sensor 263.

The obstacle sensor 261 is a sensor configured to sense an obstacle present on a traveling path of the main device 200, e.g., an appliance, a piece of furniture, a wall surface, a wall corner, or the like inside a house. The obstacle sensor 261 may be provided in the form of an ultrasonic sensor capable of recognizing a distance, but embodiments are not limited thereto.

A plurality of obstacle sensors 261 may be provided at a front portion and a side surface of the body 2 and form a circumference of the body 2. A sensor window may be provided at front surfaces of the plurality of obstacle sensors 261 to protect and block the obstacle sensors 261 from the outside.

The image sensor 263 refers to a sensor configured to recognize the position of the main device 200 and form a map of a region to be cleaned by the main device 200. The image sensor 263 may be implemented with a device capable of acquiring image data such as a camera and be provided at the top portion of the body 2. In other words, in addition to extracting a feature point from image data of the top of the main device 200, allowing the position of the main device 200 to be recognized using the feature point, and allowing a map image of a region to be cleaned to be generated, the image sensor 263 may also allow the current position of the main device 200 to be grasped from the map image. The obstacle sensor 261 and the image sensor 263 which may be mounted on the body 2 will be described in further detail below.

A main device UI 280 may be disposed at the top portion of the body 2. The main device UI 280 may include a main device input unit 281 configured to receive a user command and a main device display unit 282 configured to display various states of the main device 200, and provide a UI. For example, a battery charging state, whether the dust collector is fully filled with dust, a cleaning mode, a dormant mode of the main device 200, or the like may be displayed on the main device display unit 282. Since the forms in which the main device input unit 281 and the main device display unit 282 are implemented are the same as the above-described forms of the remote device input unit 111 and the remote device display unit 112, descriptions thereof will be omitted.

The exterior of the cleaning robot according to one embodiment has been described above. Hereinafter, a configuration of the cleaning robot according to one embodiment will be described in detail with reference to FIG. 3.

Figure 3:
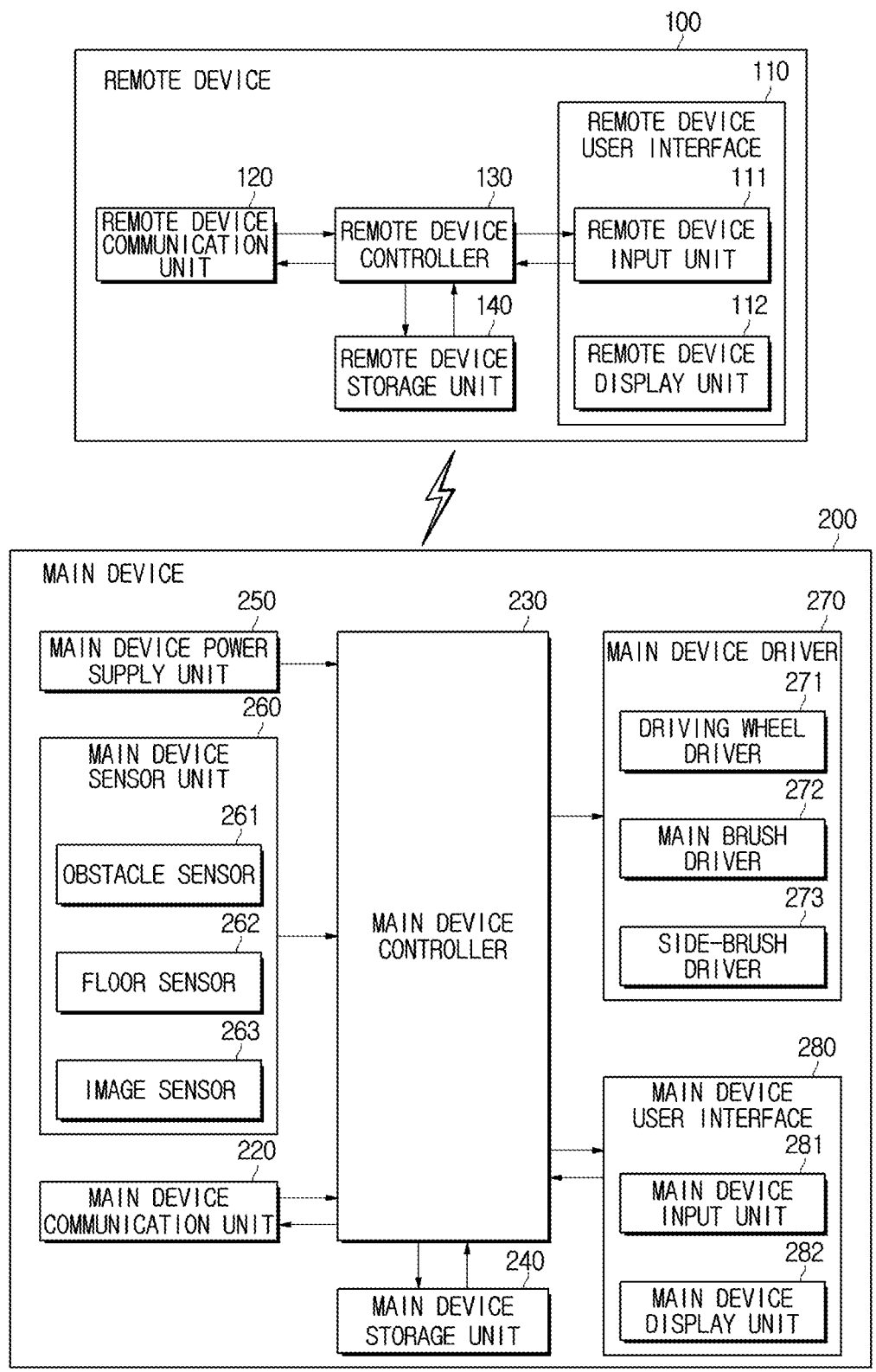
FIG. 3 is a block diagram of a control configuration of the cleaning robot.

FIG. 3 is a block diagram of a control configuration of the cleaning robot.

The cleaning robot 1 may include the remote device 100 and the main device 200 connected to each other by wired and wireless communications. The remote device 100 may include a remote device communication unit 120, a remote device controller 130, a remote device storage unit 140, and a remote device UI 110.

The remote device communication unit 120 transmits and receives various signals and data to and from the main device 200 or an external server via wired and wireless communications. For example, in accordance with a user command through the remote device UI 110, the remote device communication unit 120 may download an application for managing the main device 200 from an external server (for example, a web server, a mobile communication server or the like). The remote device communication unit 120 may also download plan view data of a region to be cleaned from the external server. Here, a plan view is a figure depicting a structure of a space in which the main device 200 is present, and plan view data is data in which a plurality of different plan views of a house are gathered.

The remote device communication unit 120 may transmit a "generate map" command of the user to the main device 200 and receive a generated map image from the main device 200. The remote device communication unit 120 may transmit a map image edited by the user to the main device 200.

The remote device communication unit 120 may also transmit commands for controlling the main device 200, such as a "start cleaning" command, an "end cleaning" command, and a "designate divided region" command input by the user, to the main device 200.

In a case in which the remote device controller 130 generates a movement path of the main device 200, the remote device communication unit 120 may also transmit information on the generated movement to the main device 200.

For this, the remote device communication unit 120 may include various communication modules such as a wireless Internet module, a short range communication module, and a mobile communication module.

The remote device communication unit 120 will be described in detail below with reference to FIG. 4A.

The remote device controller 130 controls the overall operation of the remote device 100. The remote device controller 130 may control each of the configurations of the remote device 100, i.e., the remote device communication unit 120, the remote device display unit 112, the remote device storage unit 140, and the like, on the basis of a user command input via the remote device UI 110.

The remote device controller 130 may generate a control signal for the remote device communication unit 120.

For example, in a case in which the user inputs the "generate map" command, the remote device controller 130 may generate a control signal so that the command to generate a map image including one or more divided regions is transmitted to the main device 200.

In a case in which the user inputs the "start cleaning" command, the remote device controller 130 may generate a control signal so that the start cleaning command, which moves the main device 200 to a designated divided region (hereinafter, a designated region) and makes the main device 200 perform cleaning in the designated region, is transmitted to the main device 200. Here, in a case in which the user designates a plurality of divided regions, the remote device controller 130 may generate a movement path of the main device 200 so that the main device 200 moves to any one divided region of the plurality of designated divided regions (for example, a divided region that is the closest to the main device 200), and the main device 200 moves along the plurality of designated divided regions in accordance with a set order (for example, an order starting from a divided region which is the closest to the main device 200). Even when the user does not input the "start cleaning" command, the remote device controller 130 may control the start cleaning command to be automatically transmitted to the main device 200 when a predetermined amount of time elapses after the user designates a divided region.

In a case in which the remote device controller 130 generates the movement path, the remote device controller 130 may extract region dividing points that respectively correspond to the plurality of divided regions. In a case in which the divided regions are configured as "rooms," the region dividing points may correspond to "doors" of the rooms. A method of generating the movement path and a method of extracting the region dividing points will be described in detail below.

In a case in which the user inputs the "end cleaning" command, the remote device controller 130 may generate the stop cleaning command for the main device 200 to stop cleaning that is being performed. The remote device controller 130 may generate a control signal to transmit the end cleaning command to the main device 200.

The remote device controller 130 may generate a control signal for the remote device display unit 112.

Specifically, the remote device controller 130 may generate a control signal so that a screen corresponding to a user command or a state of the main device 200 is output. The remote device controller 130 may generate a control signal so that a screen is switched in accordance with the user command or the state of the main device 200.

For example, in a case in which the user inputs the "generate map" command, the remote device controller 130 may generate a control signal so that a map image including one or more divided regions is displayed.

In a case in which the user inputs the "designate divided region" command, the remote device controller 130 may generate a control signal so that a designated region outline display attribute is changed or a designated region name display attribute is changed in accordance with the user command. As an example, the remote device controller 130 may allow color of an outline or name of a designated region to be changed or allow the outline or name of the designated region to be displayed in bold font.

In a case in which the user has input the "start cleaning" command and the main device 200 is moving to a designated region, the remote device controller 130 may generate a control signal so that the remote device display unit 112 outputs an animation, which indicates that the main device 200 is moving.

In a case in which the user has input the "start cleaning" command and the main device 200 is performing cleaning in a designated region, the remote device controller 130 may generate a control signal so that the remote device display unit 112 outputs an icon, which indicates that the main device 200 is performing cleaning.

In a case in which a movement path of the main device 200 is generated, the remote device controller 130 may generate a control signal so that the remote device display unit 112 outputs the generated movement path.

In a case in which the main device 200 has completed cleaning in the designated region, the remote device controller 130 may generate a control signal so that the remote device display unit 112 outputs an icon, which indicates that cleaning by the main device 200 is completed.

In a case in which an error occurs while the main device 200 is moving or performing cleaning, the remote device controller 130 may generate a control signal so that the remote device display unit 112 outputs an icon notifying of the occurrence of an error in the main device 200.

Screens respectively corresponding to user commands or states of the main device 200 will be described in detail below.

The remote device controller 130 may generate a control signal for the remote device storage unit 140. The remote device controller 130 may generate a control signal so that a map image is stored.

The remote device controller 130 may be various processors including at least one chip in which an integrated circuit is formed. Although the remote device controller 130 may be provided in a single processor, the remote device controller 130 may also be separately provided in a plurality of processors.

The remote device storage unit 140 temporarily or non-temporarily stores data and programs for the operation of the remote device 100. For example, the remote device storage unit 140 may store an application for managing the main device 200. The remote device storage unit 140 may also store the map image received from the main device 200 and store plan view data downloaded from an external server.

Such a remote device storage unit 140 may include at least one type of storage medium among a flash memory type, a hard disk type, a multimedia card micro type, a card type memory (for example, a secure digital (SD) or extreme digital (XD) memory, or the like), a random access memory (RAM), a static RAM (SRAM), a read-only memory (ROM), an electrically erasable programmable ROM (EEPROM), a PROM, a magnetic memory, a magnetic disk, and an optical disc. However, the remote device storage unit 140 is not limited thereto and may also be implemented in other arbitrary forms known in the same technical field. The remote device 100 may operate a web storage that performs a storage function on the Internet.

The remote device UI 110 may receive various commands for controlling the main device 200 from the user. For example, the remote device UI 110 may receive the "generate map" command for generating the map image including one or more divided regions, or receive a "manage map" command for modifying the generated map image, the "designate divided region" command for a divided region to be designated, a "manage cleaning" command for moving the main device 200 to a designated region and making the main device 200 perform cleaning, and the like.

The remote device UI 110 may also receive a "start/end" command or the like for starting or ending the cleaning by the main device 200.

The remote device UI 110 may display various pieces of information of the main device 200.

For example, the remote device UI 110 may display a map image corresponding to a region to be cleaned along which the main device 200 travels.

In a case in which the user inputs the "designate divided region" command, the remote device UI 110 may change a designated region outline display attribute or change a designated region name display attribute in accordance with a user command. As an example, the remote device controller 130 may allow color of an outline or name of a designated region to be changed or allow the outline or name of the designated region to be displayed in bold font.

In a case in which the user has input the "start cleaning" command and the main device 200 is moving to a designated region, the remote device UI 110 may output an animation, which indicates that the main device 200 is moving.

In a case in which the user has input the "start cleaning" command and the main device 200 is performing cleaning in a designated region, the remote device UI 110 may output an icon, which indicates that the main device 200 is performing cleaning.

In a case in which a movement path of the main device 200 is generated, the remote device UI 110 may display the generated movement path.

In a case in which the main device 200 has completed cleaning in the designated region, the remote device UI 110 may output an icon, which indicates that cleaning by the main device 200 is completed.

In a case in which an error occurs while the main device 200 is moving or performing cleaning, the remote device UI 110 may output an icon notifying of the occurrence of an error in the main device 200.

The main device 200 may include the main device power supply unit 250, a main device sensor unit 260, the main device communication unit 220, a main device controller 230, a main device driver 270, a main device UI 280, and a main device storage unit 240.

As described with reference to FIGS. 2A and 2B, the main device power supply unit 250 is provided as a battery and supplies driving power for driving the main device 200.

The main device communication unit 220 transmits and receives various signals and data to and from the remote device 100 or an external device via wired and wireless communications.

For example, the main device communication unit 220 may receive the "generate map" command of the user from the remote device 100 and transmit a generated map image to the remote device 100. The main device communication unit 220 may receive a map image stored in the remote device 100 and a cleaning schedule stored in the remote device 100. In this case, the stored map image may refer to a finally-stored map image, and the stored cleaning schedule may refer to a finally-stored cleaning schedule.

The main device communication unit 220 may also transmit a current state value of the main device 200 and cleaning history data to the remote device 100.

The main device communication unit 220 may receive the "start cleaning" command of the user and data related to a designated region from the remote device 100. When a situation in which a transmitted environment is inconsistent occurs while the main device 200 is performing cleaning, the main device communication unit 220 may transmit an error state value, which indicates that the environment is inconsistent, to the remote device 100. Likewise, in a case in which a region that is unable to be cleaned is generated, the main device communication unit 220 may transmit a state value, which indicates that cleaning is impossible, to the remote device 100.

In a case in which the remote device 100 generates a movement path, the main device communication unit 220 may also receive information on the generated movement path.

The main device communication unit 220 may also receive the "end cleaning" command of the user from the remote device 100.

The main device communication unit 220 will be described in detail below with reference to FIG. 4A.

The main device sensor unit 260 performs sensing of an obstacle and a state of the ground, which is required for traveling of the main device 200. The main device sensor unit 260 may include the obstacle sensor 261 and the image sensor 263.

A plurality of obstacle sensors 261 are provided at an outer circumferential surface of the body 2 and configured to sense an obstacle present in front of or beside the main device 200 and transmits a sensed result to the main device controller 230.

The obstacle sensors 261 may be provided as contact type sensors or non-contact type sensors in accordance with whether the obstacle sensors 261 come into contact with an obstacle, or may also be provided as a combination of a contact type sensor and a non-contact type sensor. A contact type sensor refers to a sensor that senses an obstacle by the body 2 actually colliding with an obstacle, and a non-contact type sensor refers to a sensor that senses an obstacle without the body 2 colliding with the obstacle or before the body 2 collides with the obstacle.

The non-contact type sensor may include an ultrasonic sensor, an optical sensor, a radiofrequency (RF) sensor, or the like. In a case in which the obstacle sensors 261 are implemented as ultrasonic sensors, the obstacle sensor 261 may transmit ultrasonic waves to a path on which the main device 200 travels, receive reflected ultrasonic waves, and sense an obstacle. In a case in which the obstacle sensors 261 are implemented as optical sensors, the obstacle sensors 261 may project light in an infrared region or visible light region, receive reflected light, and sense an obstacle. In a case in which the obstacle sensors 261 are implemented as RF sensors, the obstacle sensors 261 may transmit a radio wave having a specific frequency, for example, a microwave, using the Doppler effect, detect changes in a frequency of a reflected wave, and sense an obstacle.

The image sensor 263 may be provided as a device capable of acquiring image data such as a camera, and may be mounted on the top portion of the body 2 to recognize the position of the main device 200. The image sensor 263 extracts a feature point from image data of the top of the main device 200 and recognizes the position of the main device 200 using the feature point. Position information sensed by the image sensor 263 may be transmitted to the main device controller 230.

Sensor values of the main device sensor unit 260, i.e., sensor values of the obstacle sensors 261 and the image sensor 263, may be transmitted to the main device controller 230, and the main device controller 230 may generate a map of a region to be cleaned on the basis of the received sensor values. Since a method of generating a map on the basis of sensor values is a known technique, descriptions thereof will be omitted. FIG. 4A merely illustrates one example of the main device sensor unit 260. The main device sensor unit 260 may further include other types of sensors or some sensors may be omitted from the main device sensor unit 260 as long as a map of a region to be cleaned may be generated.

The main device driver 270 may include a driving wheel driver 271 configured to control driving of the driving wheel assemblies 30, and a main brush driver 272 configured to control driving of the main brush unit 20.

The driving wheel driver 271 is controlled by the main device controller 230 to control the driving wheels 33 and 35 mounted on the bottom of the body 2 and allow the main device 200 to move. In a case in which the "generate map" command, the "start cleaning" command, a "move region" command, or the like of the user is transmitted to the main device 200, the driving wheel driver 271 controls driving of the driving wheels 33 and 35, and the main device 200 travels in accordance with the control. The driving wheel driver 271 may also be included in the driving wheel assemblies 30 and be modularized together with the driving wheel assemblies 30.

The main brush driver 272 drives the roller 22 mounted at the side of the suction hole 23 of the body 2 in accordance with control by the main device controller 230. In accordance with rotation of the roller 22, the main brush 21 may be rotated and clean a floor surface. When the "start cleaning" command of the user is transmitted to the main device 200, the main brush driver 272 controls driving of the roller 22.

The main device controller 230 controls the overall operation of the main device 200. The main device controller 230 may control the configurations of the main device 200, i.e., the main device communication unit 220, the main device driver 270, the main device storage unit 240, and the like, and generate a map image.

Specifically, the main device controller 230 may generate a control signal for the main device driver 270.

For example, in a case in which the main device controller 230 receives the "generate map" command, the main device controller 230 may generate a control signal for the driving wheel driver 271 to drive the driving wheels 33 and 35. While the driving wheels 33 and 35 are driven, the main device controller 230 may receive sensor values from the main device sensor unit 260 and generate a map image of a region to be cleaned on the basis of the received sensor values.

In a case in which the main device controller 230 receives the "start cleaning" command and data related to a designated region, the main device controller 230 may generate a control signal for the driving wheel driver 271 for the main device 200 to be moved to the designated region by the user. In a case in which the main device 200 is moved to the designated region, the main device controller 230 may control the main brush driver 272 to drive the main brush unit 20 while generating a control signal related to the driving wheel driver 271 to drive the driving wheels 33 and 35.

The main device controller 230 may generate a map image.

Specifically, in a case in which the main device controller 230 receives the "generate map" command, the main device controller 230 may receive sensor values from the main device sensor unit 260, generate a map including obstacle information, analyze a structure of the generated map, and divide the map into a plurality of regions.

The main device controller 230 may substitute the plurality of divided regions with preset figures different from each other and generate a map image in which the plurality of preset figures are combined.

The main device controller 230 may find a plan view corresponding to the analyzed map structure among pieces of plan view data stored in the main device storage unit 240 and postprocess the corresponding plan view to generate a map image.

In a case in which the user designates a plurality of divided regions, although it has been described in the above-described embodiment that the remote device controller 130 generates a movement path of the main device 200, the main device controller 230 may also generate the movement path. In this case, the main device controller 230 may generate a control signal so that the main device communication unit 220 transmits information on the generated movement path to the remote device 100, and the main device driver 270 travels and performs cleaning along the generated movement path.

When the user inputs the "start cleaning" command or even when the user does not input the "start cleaning" command, the remote device controller 130 may generate a control signal so that the main device driver 270 travels and performs cleaning along the generated movement path when a predetermined amount of time elapses after the user designates a divided region.

Hereinafter, for convenience of description, a case in which the main device controller 230 generates the movement path will be described as an example.

The main device controller 230 may generate control signals for the main device communication unit 220 and the main device UI 280.

For example, the main device controller 230 may generate a control signal so that the main device communication unit 220 transmits a generated map image to the remote device 100, and may generate a control signal so that the main device UI 280 displays the generated map image.

In a case in which the main device controller 230 receives the "start cleaning" command and data related to a designated region, the main device controller 230 may generate a control signal so that the main device communication unit 220 transmits a state value of the main device 200 (for example, whether the main device 200 is moving or performing cleaning, has completed cleaning, or whether an error has occurred) to the remote device 100.

In a case in which the main device controller 230 generates the movement path of the main device 200, the main device controller 230 may also generate a control signal so that the main device communication unit 220 transmits information on the generated movement to the remote device 100.

The main device controller 230 may determine whether an environment is inconsistent while the main device 200 performs cleaning. In a case in which the environment is inconsistent, the main device controller 230 may control the main device communication unit 220 to transmit an error state value, which indicates that the environment is inconsistent, to the remote device 100. The user may check an error state and decide whether to update a map image. In a case in which the main device controller 230 receives an "update map" command, the main device controller 230 updates the map image on the basis of a user command. In a case in which the environment is inconsistent, the main device controller 230 may also automatically update the map image.

To prevent malfunctioning due to the environmental inconsistency, in a case in which the environment is inconsistent, the main device controller 230 may control the main device 100 to stop cleaning and return to be charged.

While the main device 200 performs cleaning, the main device controller 230 may determine whether a region that is unable to be cleaned is present. In a case in which a region unable to be cleaned is present, the main device controller 230 may control the main device communication unit 220 to transmit the error state value, which indicates that the region unable to be cleaned is present. The user may check that the region unable to be cleaned is present and determine whether to change a region to be cleaned. In a case in which the main device controller 230 receives a "move divided region" command, the main device controller 230 generates a control signal so that the main device moves to the next divided region. In a case in which a region unable to be cleaned is present, the main device controller 230 may automatically generate a control signal for the main device 200 to move to the next divided region along the generated movement path. For example, the order of divided regions in which the main device 200 moves may be set to be clockwise or counterclockwise from a divided region that is the closest to the main device 200 or from a divided region that is the farthest from the main device 200, may be set to be from the largest divided region to the smallest divided region, or may be set to be from the smallest divided region to the largest divided region. In this way, various methods may be employed in accordance with the user's setting. Even in this case, the main device controller 230 may control the main device 100 to stop cleaning and return to be charged.

The main device controller 230 may generate a control signal for the main device storage unit 240. The main device controller 230 may also generate a control signal so that a generated map image is stored. The main device controller 230 may generate a control signal so that a map image and a cleaning schedule received from the remote device 100 are stored.

The main device controller 230 may be various processors including at least one chip in which an integrated circuit is formed. Although the main device controller 230 may be provided in a single processor, the main device controller 230 may also be separately provided in a plurality of processors.

The main device UI 280 may display a current operation situation of the main device 200 and a map image of a section in which the main device 200 is currently present, and display the current position of the main device 200 on the displayed map image. The main device UI 280 may receive an operation command of the user and transmit the received operation command to a controller. The main device UI 280 may be the same as or different from the main device UI 280 which has been described with reference to FIGS. 1 to 2B.

The main device UI 280 may include the main device input unit 281 and the main device display unit 282. Since the forms in which the main device input unit 281 and the main device display unit 282 are implemented may be the same as the above-described forms of the remote device input unit 111 and the remote device display unit 112, descriptions thereof will be omitted.

Although it has been described in the above-described embodiment that the remote device input unit 111 of the remote device UI 110 receives the generate map command, the designate divided region command, the start cleaning command, and the end cleaning command, such user commands may also be directly received by the main device input unit 281 of the main device UI 280.

Although it has been described in the above-described embodiment that the remote device display unit 112 of the remote device UI 110 outputs a screen corresponding to a user command or a state of the main device 200, the screen corresponding to a user command or a state of the main device 200 may also be directly output by the main device display unit 282 of the main device UI 280.

The main device storage unit 240 temporarily or non-temporarily stores data and programs for the operation of the main device 200. For example, the main device storage unit 240 may temporarily or non-temporarily store a state value of the main device 200. The main device storage unit 240 may store cleaning history data, and the cleaning history data may be periodically or non-periodically updated. In a case in which the main device controller 230 generates a map image or updates the map image, the main device storage unit 240 may store the generated map image or the updated map image. The main device storage unit 240 may store a map image received from the remote device 100.

The main device storage unit 240 may store a program for generating the map image or updating the map image. The main device storage unit 240 may store a program for generating or updating the cleaning history data. The main device storage unit 240 may also store a program for determining whether an environment is consistent, a program for determining whether a certain region is a region unable to be cleaned, or the like.

Such a main device storage unit 240 may include at least one type of storage medium from among a flash memory type, a hard disk type, a multimedia card micro type, a card type memory (for example, a SD or XD memory, or the like), a RAM, a SRAM, a ROM, an EEPROM, a PROM, a magnetic memory, a magnetic disk, and an optical disc. However, the main device storage unit 240 is not limited thereto and may also be implemented in other arbitrary forms known in the same technical field.

Figure 4A:
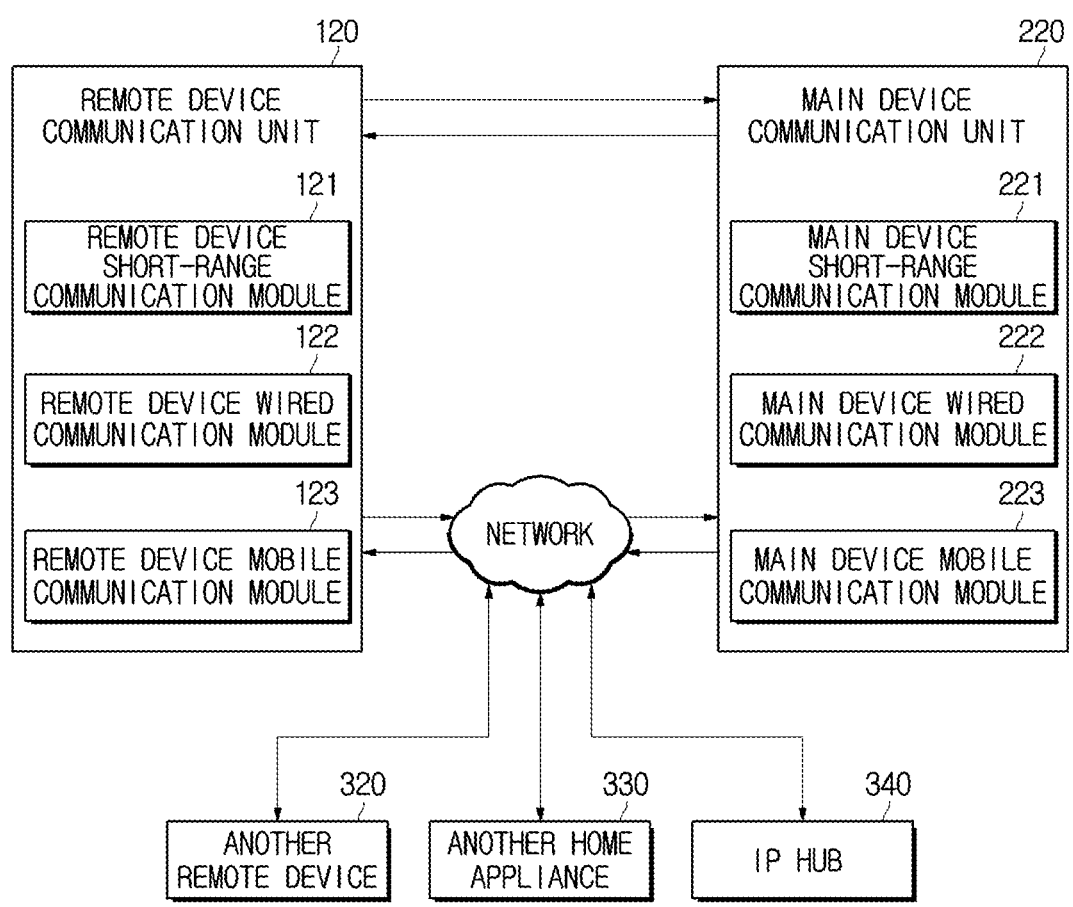
FIG. 4A is a control block diagram of a communication unit according to one embodiment.
Figure 4B:
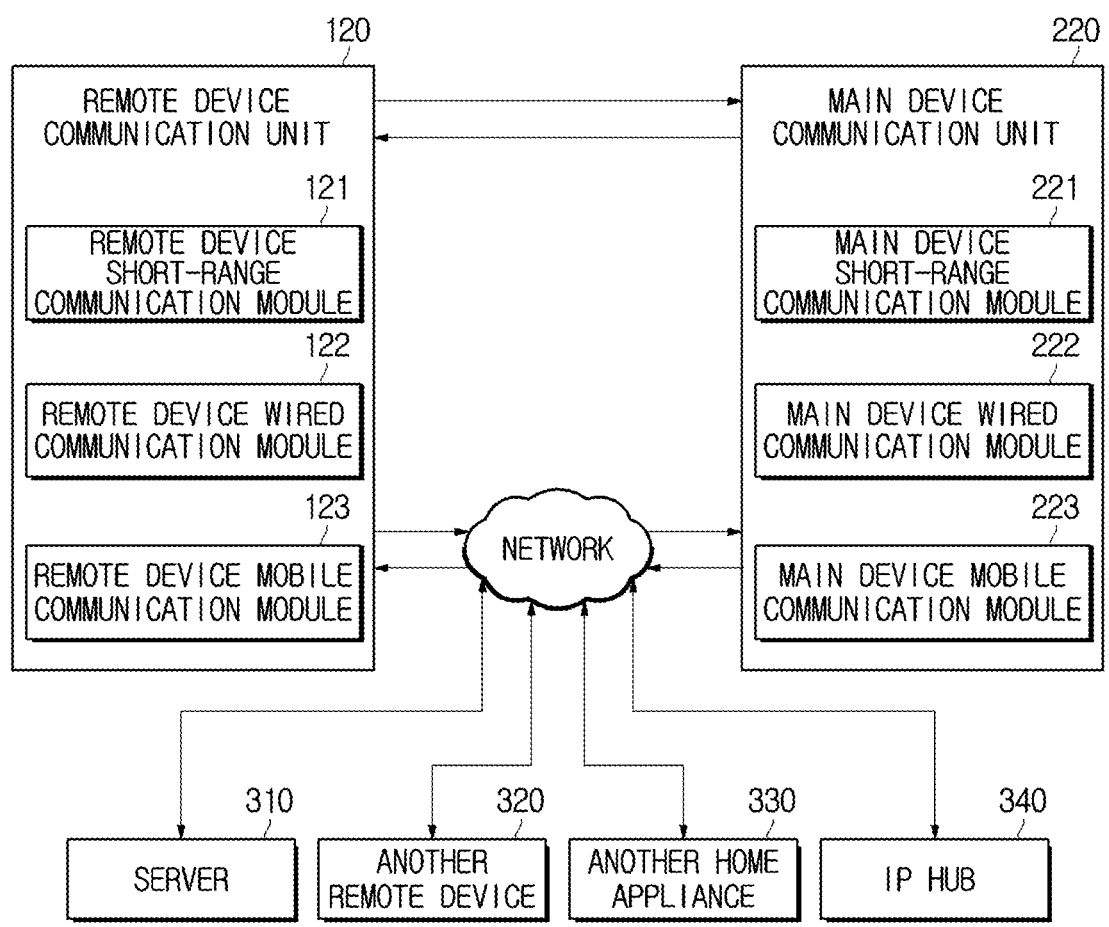
FIG. 4B is a control block diagram of a communication unit according to another embodiment.

FIG. 4A is a control block diagram of a communication unit according to one embodiment, and FIG. 4B is a control block diagram of a communication unit according to another embodiment.

Referring to FIG. 4A, a communication unit may include a remote device communication unit 120 included in a remote device 100 and a main device communication unit 220 included in a main device 200.

The remote device communication unit 120, the main device communication unit 220, and a network may be connected to each other and transmit and receive data to and from each other. For example, the main device communication unit 220 may transmit a map image generated by the main device controller 230, the current position of the main device 200, and a state value of the main device 200 to the remote device 100, and the remote device communication unit 120 may transmit a user command to the main device 200. The remote device communication unit 120 may be connected to the network, receive an operation state of another home appliance 330, and transmit a control command related thereto. The main device communication unit 220 may be connected to another remote device 320 and receive the control command therefrom.

Referring to FIG. 4B, the main device communication unit 220 may be connected to the network and download plan view data from a server 310.

The remote device communication unit 120 may include a remote device short range communication module 121, which is a short range communication module, a remote device wired communication module 122, which is a wired communication module, and a remote device mobile communication module 123, which is a mobile communication module. The main device communication unit 220 may include a main device short range communication module 221, which is a short range communication module, a main device wired communication module 222, which is a wired communication module, and a main device mobile communication module 223, which is a mobile communication module.

Here, the short range communication module may be a module for short range communication within a predetermined distance. A short range communication technique may include a wireless local area network (LAN), a wireless fidelity (Wi-Fi), Bluetooth, ZigBee, Wi-Fi Direct (WFD), ultra wideband (UWB), infrared data association (IrDA), Bluetooth low energy (BLE), near field communication (NFC), and the like, but is not limited thereto.

The wired communication module refers to a module for communication using an electrical signal or an optical signal. A wired communication technique may include a pair cable, a coaxial cable, an optical fiber cable, an Ethernet cable, and the like, but is not limited thereto.

The mobile communication module may transmit and receive a wireless signal to and from at least one of a base station, an external terminal, and the server 310 in a mobile communication network. The wireless signal may include a voice call signal, a video call signal, or various forms of data in accordance with transmission and reception of text/multimedia messages.

Hereinafter, a menu selection screen displayed on a remote device according to one embodiment will be described with reference to FIGS. 5 and 6.

Figure 5:
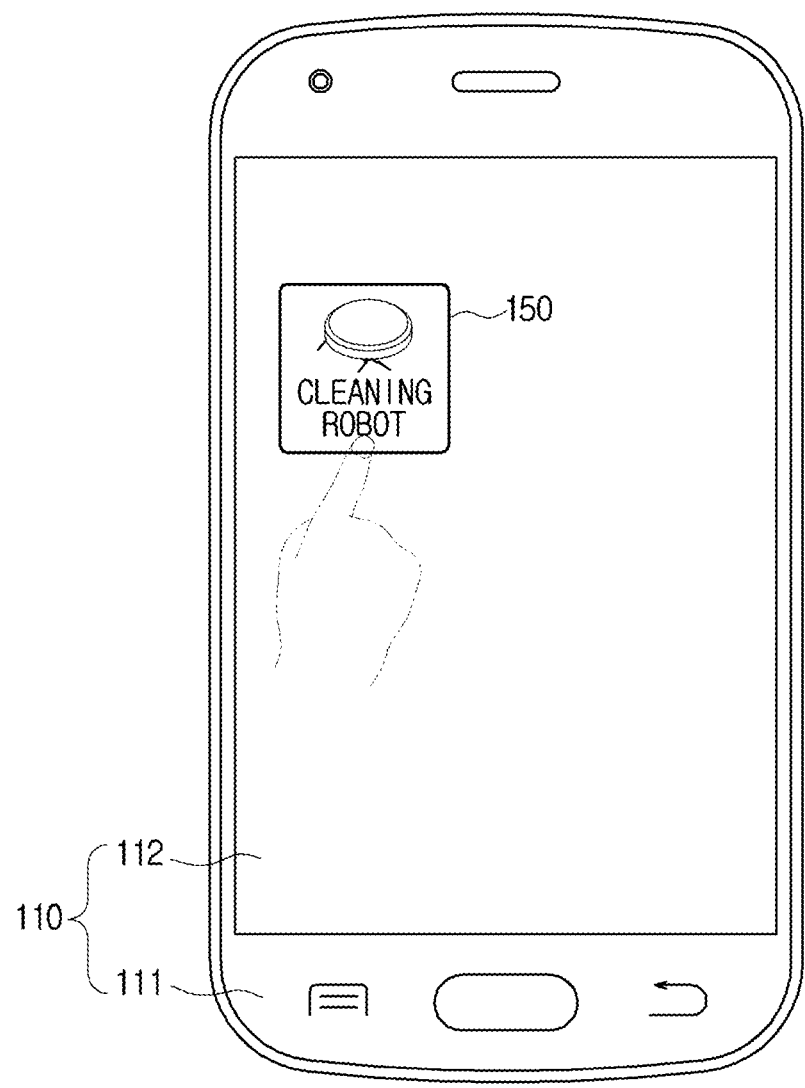
FIG. 5 is an exemplary view of a home screen of a remote device UI.

FIG. 5 is an exemplary view of a home screen of a remote device UI.

The remote device UI 110 including the remote device input unit 111 and the remote device display unit 112 may be provided at a front surface of the remote device 100. The remote device input unit 111 may include a plurality of buttons. In this case, the buttons may be hardware buttons or software buttons. The remote device display unit 112 may be configured as a TSP and sense a user's input.

An application for managing the main device 200 may be installed in the remote device 100. In this case, the application for managing the main device 200 will be simply referred to as a "cleaning robot application."

Although a case in which the cleaning robot application is installed in the remote device 100 is employed in the embodiment below, embodiments are not necessarily limited thereto, and the cleaning robot application may also be directly installed in the main device 200.

The remote device display unit 112 may display the installed application on the home screen and provide convenience for the user to access the application. For example, the remote device display unit 112 may display the installed application with an icon 150 titled "cleaning robot."

The user may execute the cleaning robot application by touching the "cleaning robot" icon 150. When the cleaning robot application is executed, the remote device display unit 112 may switch the screen to the one illustrated in FIG. 6.

Figure 6:
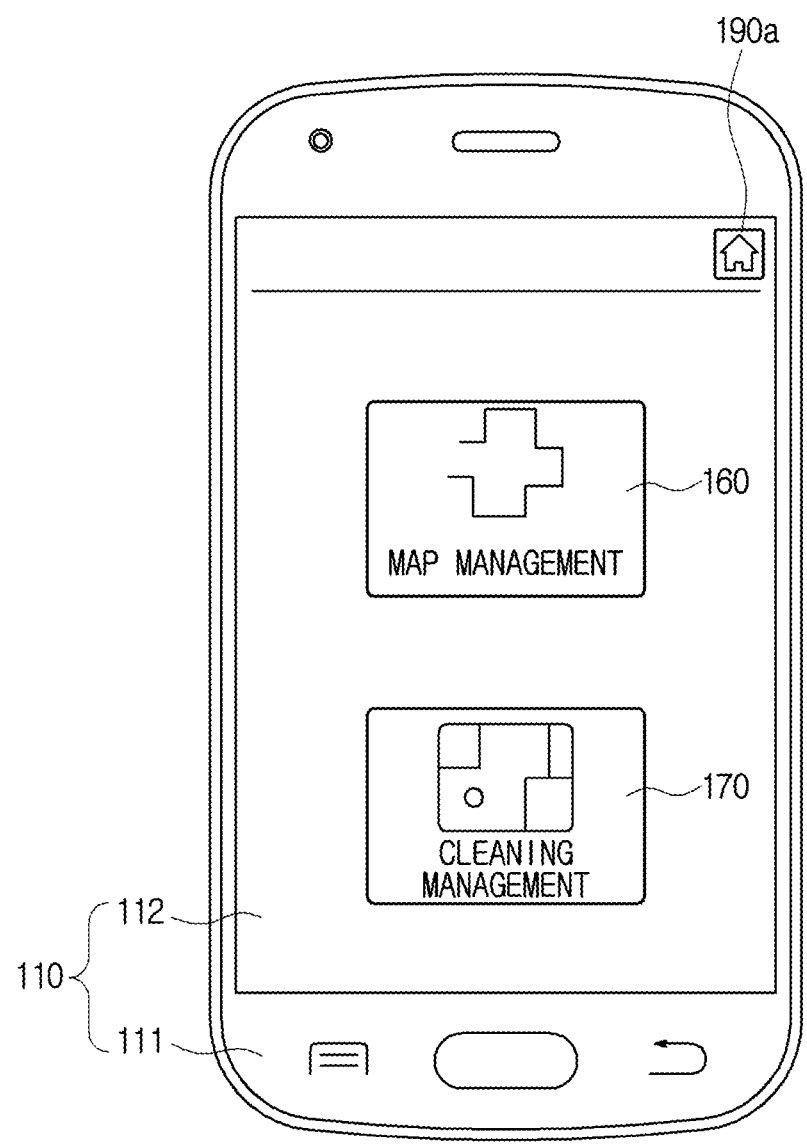
FIG. 6 is an exemplary view of a menu selection screen of the remote device UI.

FIG. 6 is an exemplary view of a menu selection screen of the remote device UI.

A "home screen" icon 190*a* may be displayed at the top of a remote device display unit 112 for returning to the home screen. That is, when the "home screen" icon 190*a* is selected, the screen may be switched back to the one illustrated in FIG. 5. A "map management" icon 160 and a "cleaning management" icon 170 may be sequentially displayed in that order below the "home screen" icon 190*a*. Here, the "map management" icon 160 is an icon provided for generating or managing a map image of a region in which the main device 200 travels or cleans, i.e., a region to be cleaned. The "cleaning management" icon 170 is an icon provided for designating a specific divided region on the basis of a generated map image and making the main device 200 move or perform cleaning.

The user may select the "cleaning management" icon 170 and switch the screen of the remote device display unit 112 to a screen for making the main device 200 move or perform cleaning.

Figure 7:
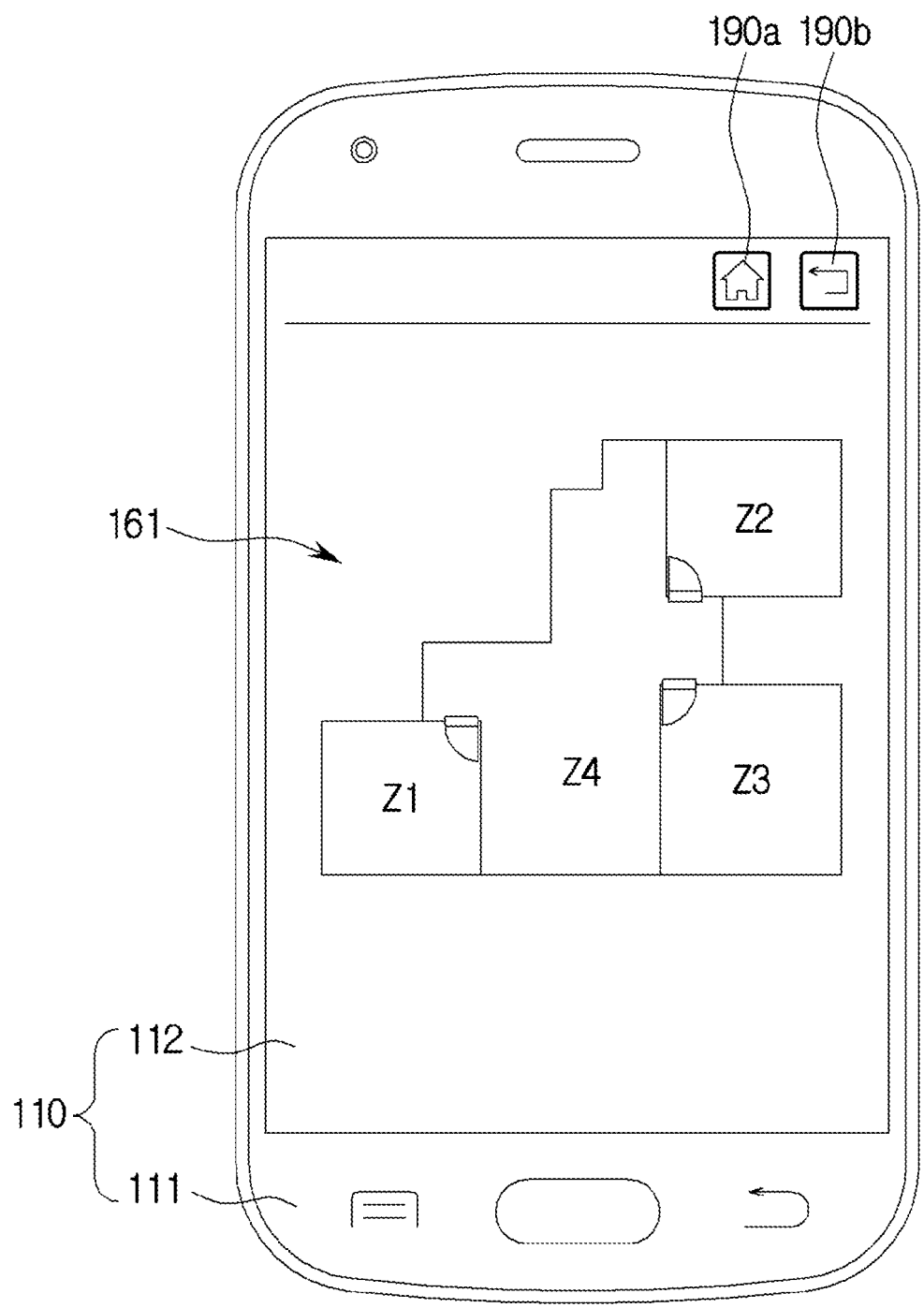
FIG. 7 is an exemplary view of a map image displayed by the remote device UI of the cleaning robot according to one embodiment.
Figure 8:
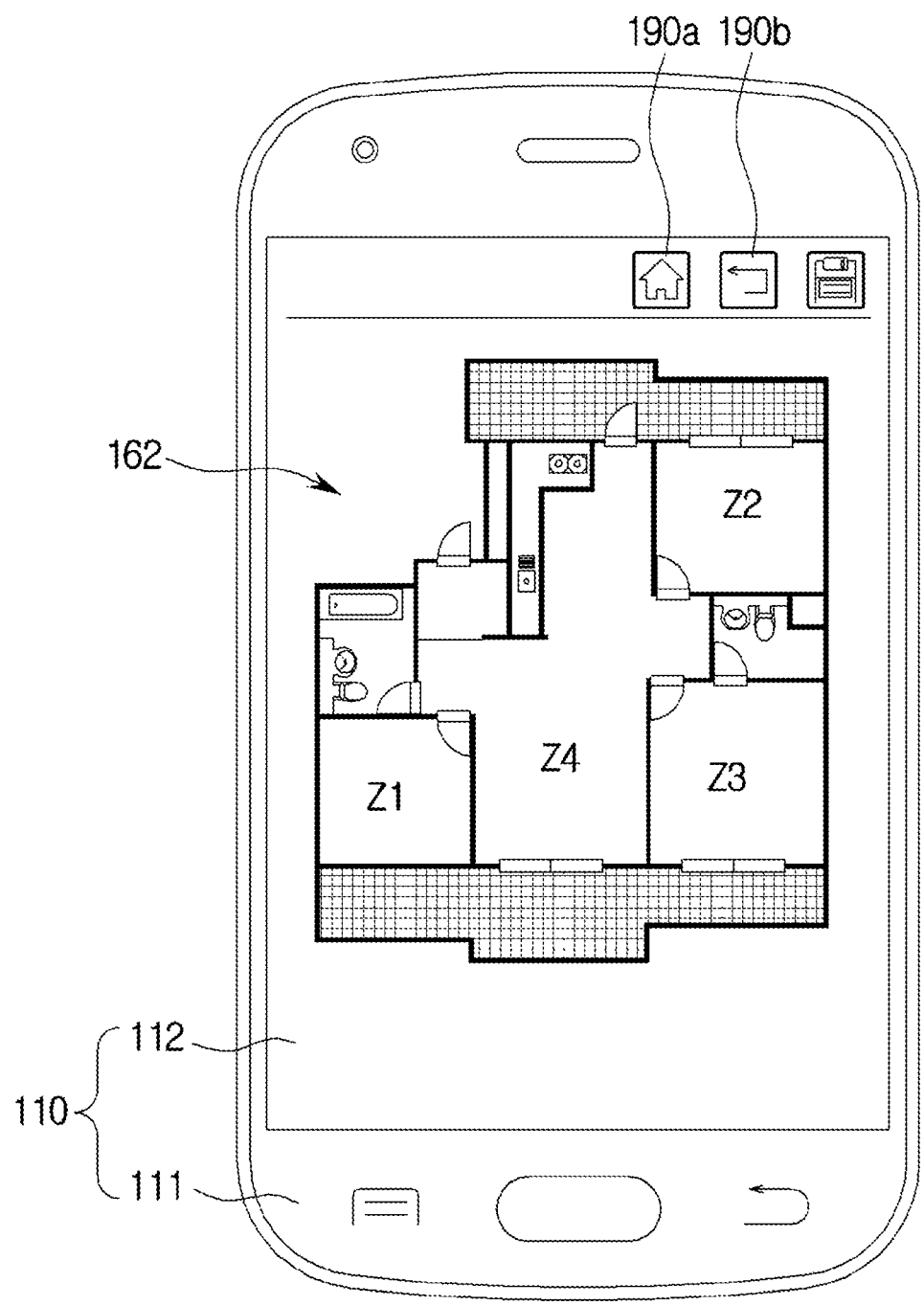
FIG. 8 is an exemplary view of a map image displayed by the remote device UI of the cleaning robot according to another embodiment.

FIG. 7 is an exemplary view of a map image displayed by the remote device UI of the cleaning robot according to one embodiment, and FIG. 8 is an exemplary view of a map image displayed by the remote device UI of the cleaning robot according to another embodiment.

In accordance with a user's input on a "map generation" icon, a main device controller 230 may perform cleaning or move at least one time in a space in which a main device 200 is currently present, generate a map including obstacle information, and analyze a structure of the map on the basis of the generated map. The main device controller 230 may divide the map into a plurality of regions on the basis of the analyzed map structure, and generate a map image including the plurality of divided regions.

The map image generated by the main device controller 230 according to one embodiment may be transmitted to a remote device 100 via a main device communication unit 220 and a remote device communication unit 120, and the transmitted map image may be displayed on a remote device UI 110.

Specifically, in a case in which the main device controller 230 combines four divided regions (first to fourth regions Z1 to Z4) and generates a map image depicting one living room and three rooms, the map image may be generated so that a fourth region Z4, which is a living room, is disposed at the center, a first region Z1, which is a room, is disposed at the left from the fourth region Z4, and a second region 410 and a third region Z3 are disposed at the right from the fourth region Z4 as shown in FIG. 7. A map image 161 in which figures corresponding to sizes of the divided regions are placed as the first region Z1 to the third region Z3 may be generated, and the generated map image 161 may be displayed on the remote device UI 110. Here, the figures include free figures formed as closed loops.

The main device controller 230 according to another embodiment may search for a plan view 162 corresponding to a map image as shown in FIG. 8 from the main device storage unit 240 and allow the found plan view 162 to be displayed on the remote device UI 110.

Cleaning operations and screens of the cleaning robot 1 disclosed in FIGS. 9 to 19 may be performed and displayed in a case in which the user selects the "cleaning management" icon 170 illustrated in FIG. 6, or may be automatically performed and displayed after a map image is generated.

Hereinafter, for convenience of description, a process performed in a case in which a "manage cleaning" command is input to the cleaning robot will be described using the map image 161 according to one embodiment illustrated in FIG. 7 as an example. FIGS. 9 to 16 are conceptual diagrams for describing processes in which the user commands cleaning operations of the cleaning robot on the basis of a map image displayed by the remote device UI of the cleaning robot and screens output by the remote device UI in accordance with user commands or states of the main device according to one embodiment.

Figure 9:
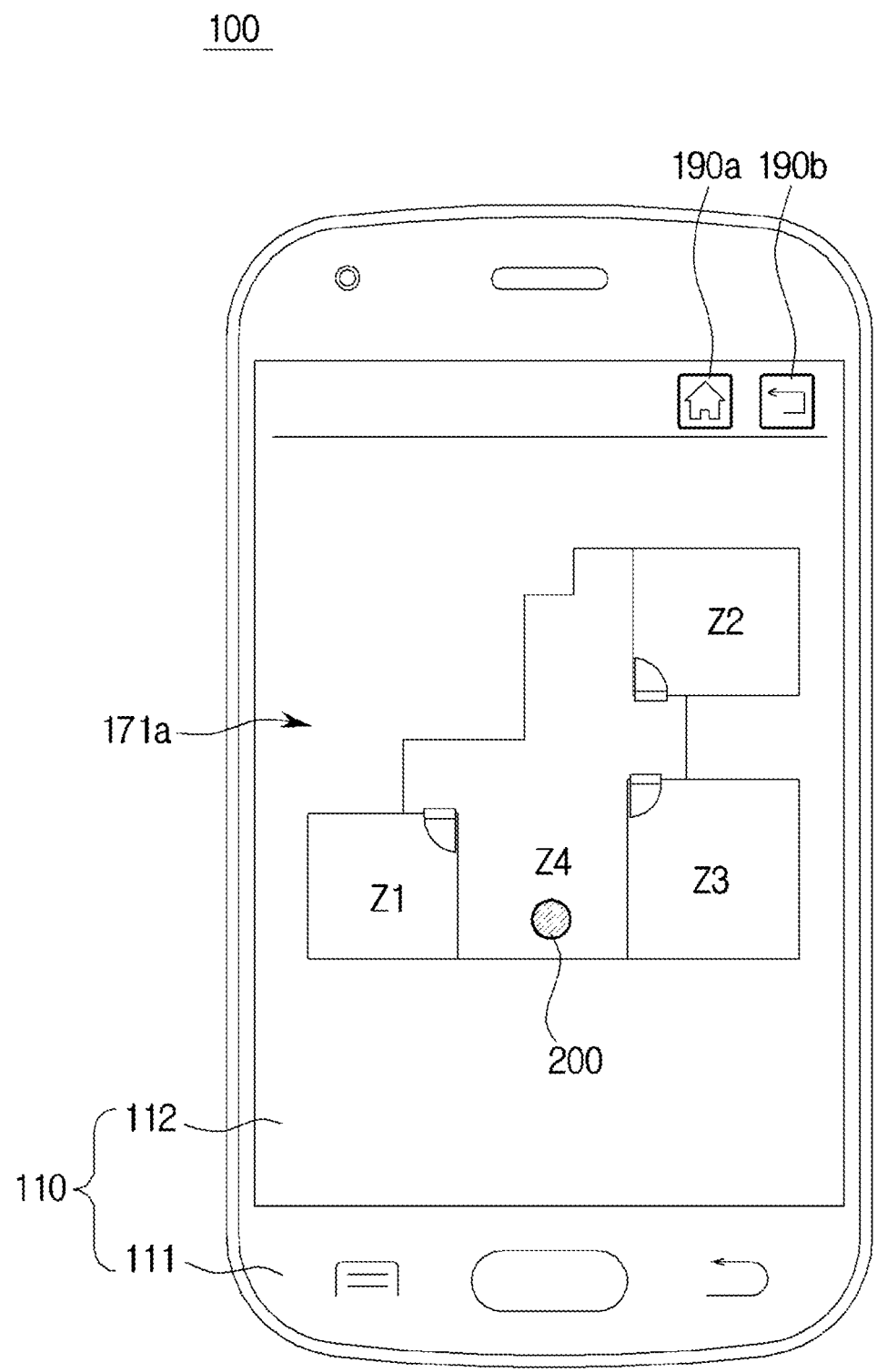
FIGS. 9 to 16 are conceptual diagrams for describing processes in which the user commands cleaning operations of the cleaning robot on the basis of a map image displayed by the remote device UI of the cleaning robot and screens output by the remote device UI in accordance with user commands or states of the main device according to one embodiment.

Referring to FIG. 9, a "home screen" icon 190a and a "previous screen" icon 190b for returning to the previous screen may be displayed at the top of the remote device UI 110 according to one embodiment. That is, when the "previous screen" icon 190b is selected, the screen may be switched back to the previous screen.

The remote device UI 110 may display (171a) a map image 171a showing that a main device 200 is currently at the center of the bottom of a fourth region Z4, which is a living room.

The current position of the main device 200 may be determined by a main device controller 230 on the basis of values sensed by a main device sensor unit 260, and the main device controller 230 may match the current position of the main device 200 to the map image 171a stored in a main device storage unit 240 to control the UI 110 to display the position of the main device 200 on the map image 171a.

Figure 10:
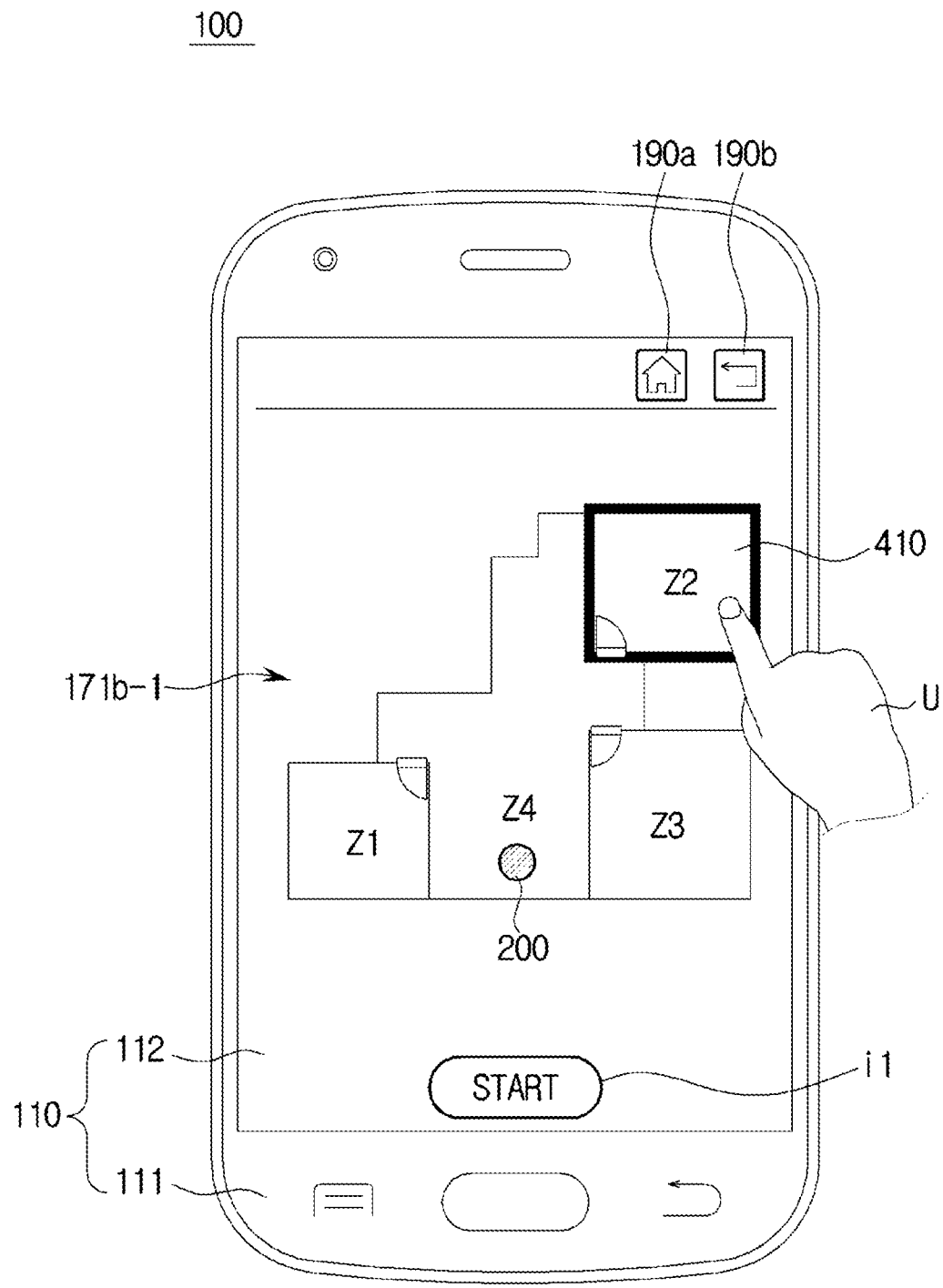

As illustrated in FIG. 10, a user U may specify and designate a second region 410, in which the user U wishes to perform cleaning or to which the user U wishes to move a main device 200, from a map image 171b-1 using his or her finger. In a case in which the user U designates the second region 410, a remote device UI 110 may change an outline display attribute of the second region 410 by displaying an outline of the second region 410 in a different color or displaying (171b-1) the outline of the second region 410 in bold font so that the second region 410, which is a designated region 410, is differentiated from the other divided regions.

In a case in which at least one divided region is designated by the user U, the remote device UI 110 may display a "start cleaning" icon i1 at the bottom of the screen.

By selecting the "start cleaning" icon i1 at the bottom of the screen, the user U may input the start cleaning command so that the main device 200 moves to the designated region 410 along a generated movement path and performs cleaning. In addition, the user U may input the start cleaning command using various other methods such as a voice command. Various known techniques may be employed as a method of inputting the start cleaning command. The main device 200 may also automatically start cleaning along the movement path when a predetermined amount of time elapses after the designate divided region command is input.

In a case in which the start cleaning command is input, the remote device communication unit 120 transmits information on the input start cleaning command and the designated region 410 designated by the user U to the main device communication unit 220. Then, a main device controller 230 moves the main device 200 to the designated region 410 and, in a case in which the main device 200 is moved to the designated region 410, controls the main device 200 to perform cleaning. In this case, a main device communication unit 220 may transmit a current state value of the main device 200 (for example, whether the main device 200 is moving or performing cleaning, has completed cleaning, or whether an error occurred) and cleaning history data to the remote device communication unit 120.

In a case in which the main device 200 moves to the designated region 410, the main device 200 may move along a movement path generated by the main device controller 230 or the remote device controller 130. The generation of the movement path will be described below.

Figure 11:
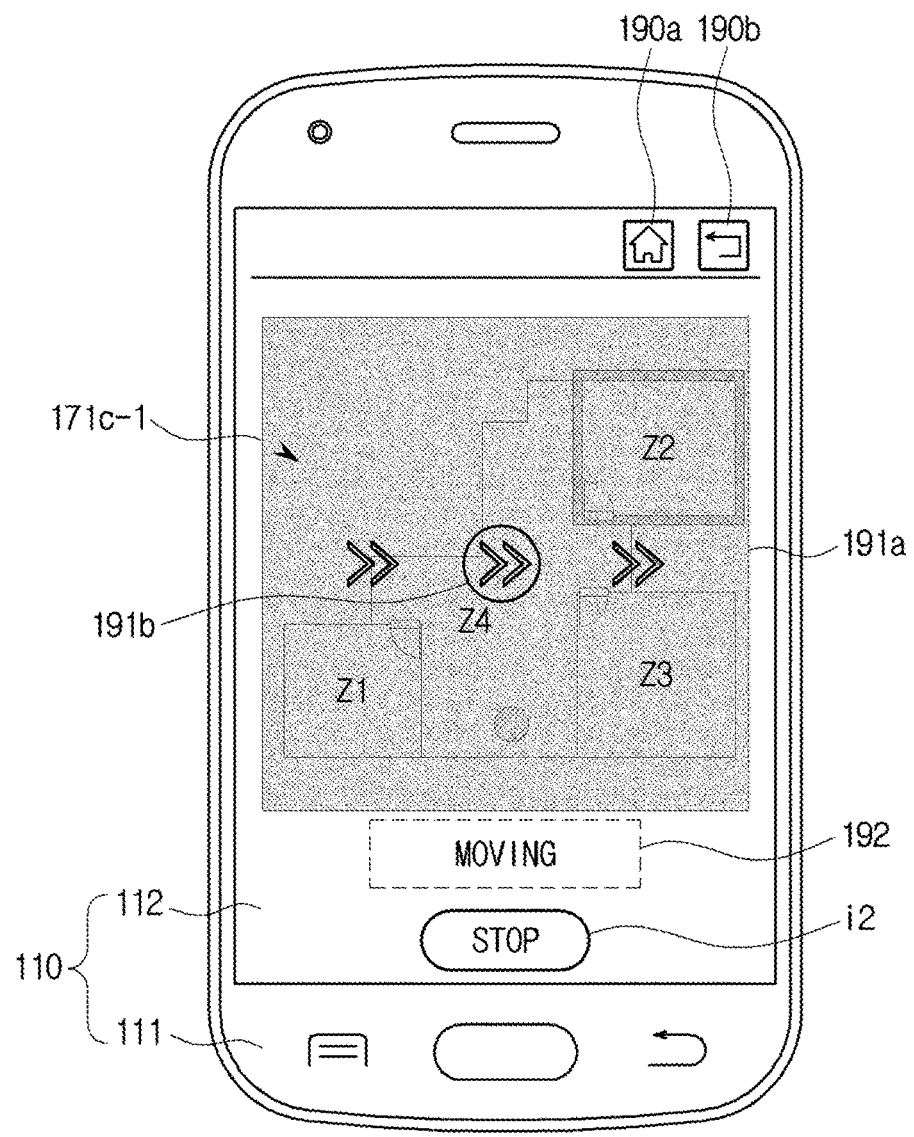

According to one embodiment, in a case in which the remote device communication unit 120 receives a "moving" state value as the current state value of the main device 200 from the main device communication unit 220, as illustrated in FIG. 11, the remote device UI 110 may display a translucent layer 191a over a map image 171c-1, and the main device 200 may display an animation 191b from which a user may intuitively recognize that the main device 200 is moving. In addition, the remote device UI 110 may display a message 192, which indicates that the main device 200 is moving.

In a case in which the start cleaning command is input, the "start cleaning" icon i1 at the bottom of the screen may be changed to an "end cleaning" icon i2.

By selecting the "end cleaning" icon i2 at the bottom of the screen, the user U may input the end cleaning command so that the main device 200 stops cleaning that was being performed. In addition, the user U may input the end cleaning command using various other methods such as a voice command. Various known techniques may be employed as a method of inputting the end cleaning command.

Figure 12:
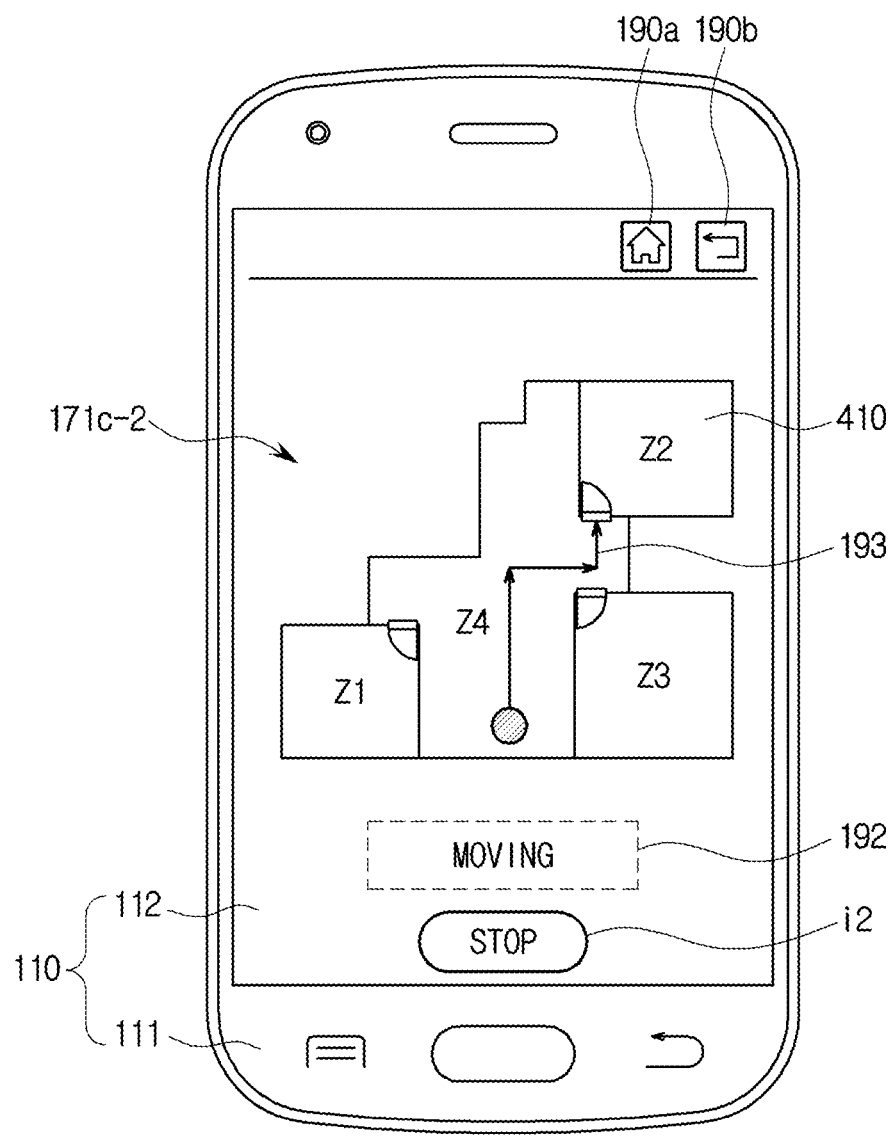

According to another embodiment, as illustrated in FIG. 12, in a case in which a remote device communication unit 120 receives a "moving" state value as a current state value of a main device 200 from a main device communication unit 220, a remote device UI 110 may display a movement path 193 of the main device 200. The movement path may be a predicted movement path to the designated region 410 that is arbitrarily generated by a remote device controller 130 or a main device controller 230 regardless of an actual movement path of the main device 200, may be an actual path along which the main device 200 moves in real time, or may include both the predicted movement path and the actual path.

For example, a predicted movement path 193 may be generated for the main device 200 to move upward from the fourth region Z4 and then move rightward so as to move from the point at which the main device 200 is currently present to the designated region 410. In a case in which a plurality of designated regions are present, the predicted movement path 193 may also be a path indicating an order of designated regions in which the main device 200 moves.

In a case in which the movement path includes both the predicted movement path and the actual path, a path through which the main device 200 has already passed may be removed from the predicted movement path in real time. A path through which the main device 200 has already passed may also be removed in a case in which the main device 200 has completed moving.

In a case in which the main device 200 is moving, the remote device UI 110 may re-change the outline display attribute of the designated region 410 on a map image 171c-2 and may also change the outline display attribute to correspond to that prior to a divided region being designated. However, since the outline display attribute may also be re-changed in a case in which the remote device communication unit 120 receives a "cleaning completed" state value as the current state value of the main device 200 from the main device communication unit 220, the outline display attribute being re-changed in a case in which the cleaning completed state value is transmitted will be described below as an example.

Figure 13:
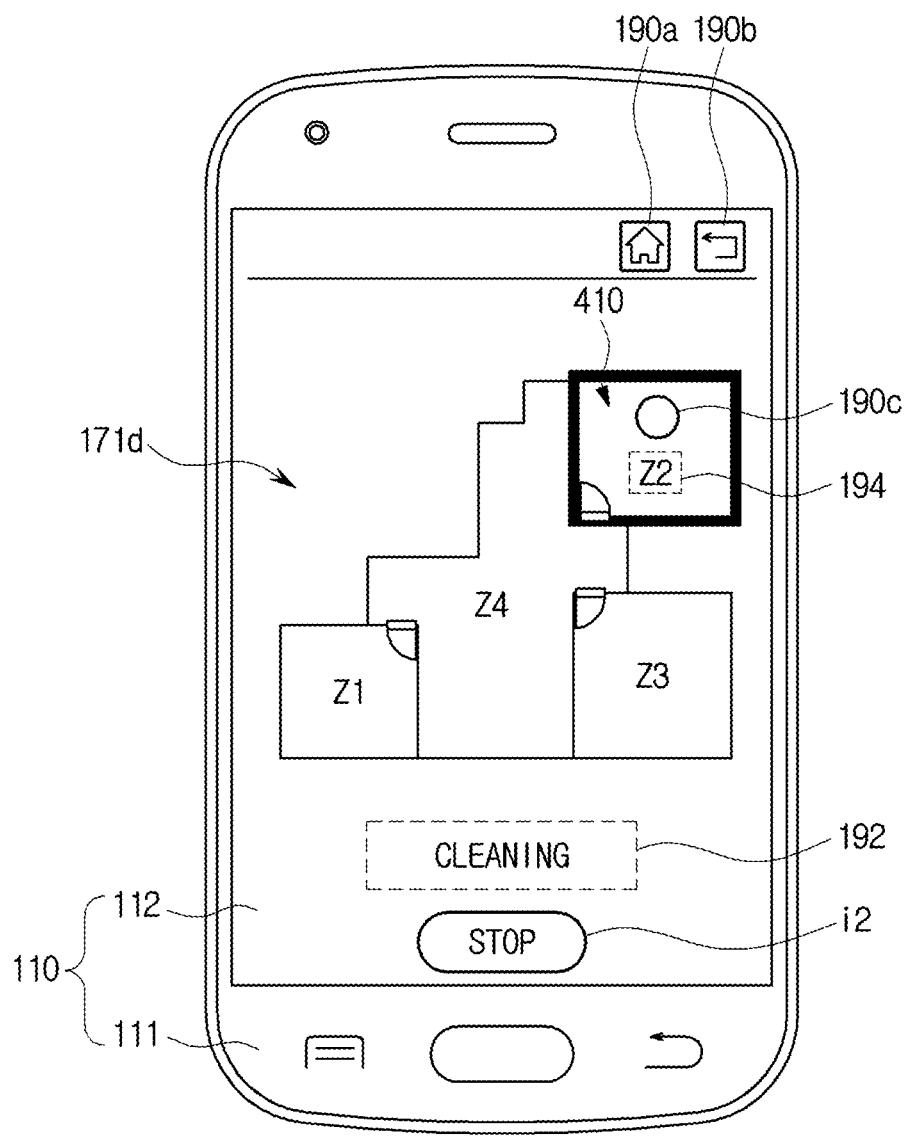
Figure 14:
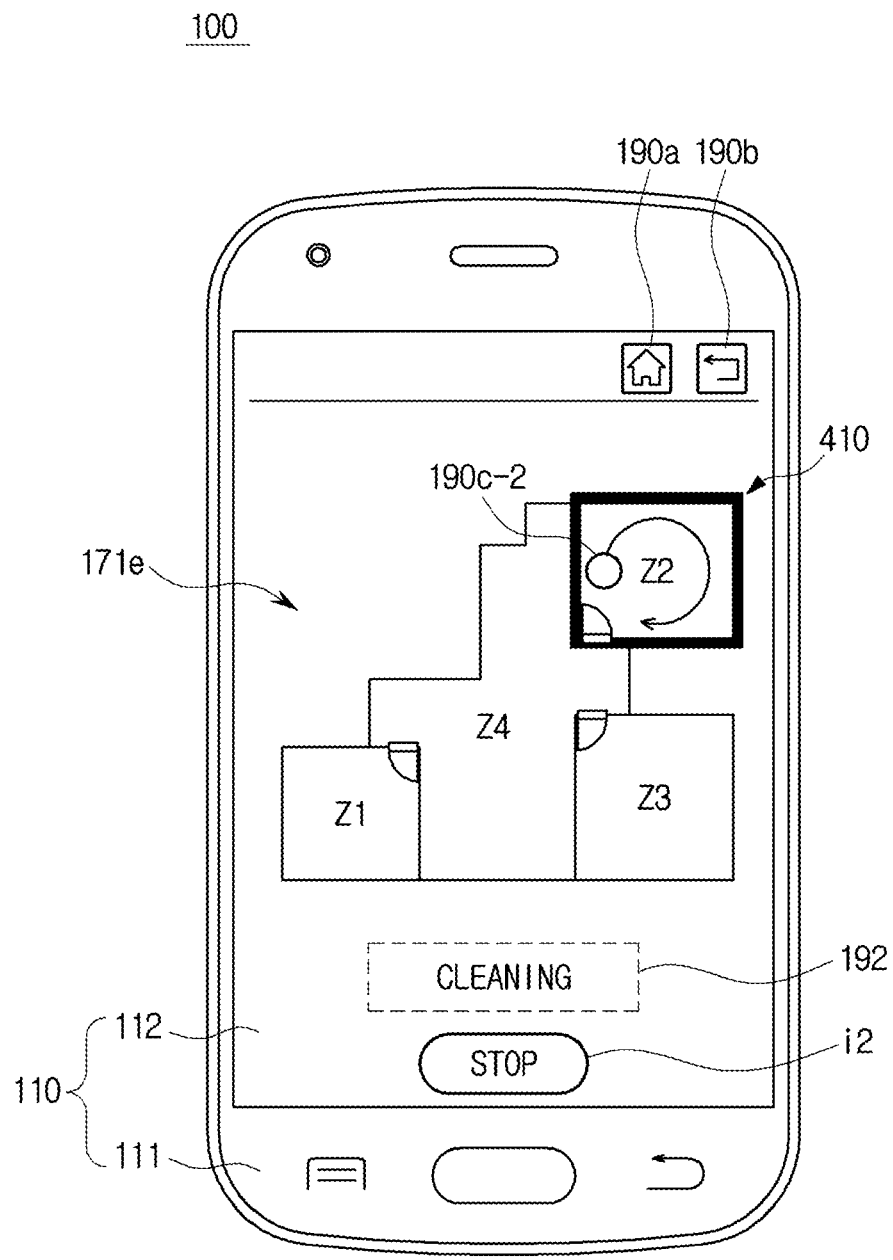

In a case in which the remote device communication unit 120 receives a "cleaning" state value as the current state value of the main device 200 from the main device communication unit 220, as illustrated in FIG. 13, the remote device UI 110 may display a "cleaning" icon (for example, a hollow circular icon), which indicates that cleaning is being performed, above a name 194 of the designated region 410. As illustrated in FIG. 14, a "cleaning icon" 190c may also be displayed in the form of animation that moves within the designated region 410.

The remote device UI 110 may also display a message 192, which indicates that the main device 200 is performing cleaning.

Figure 15:
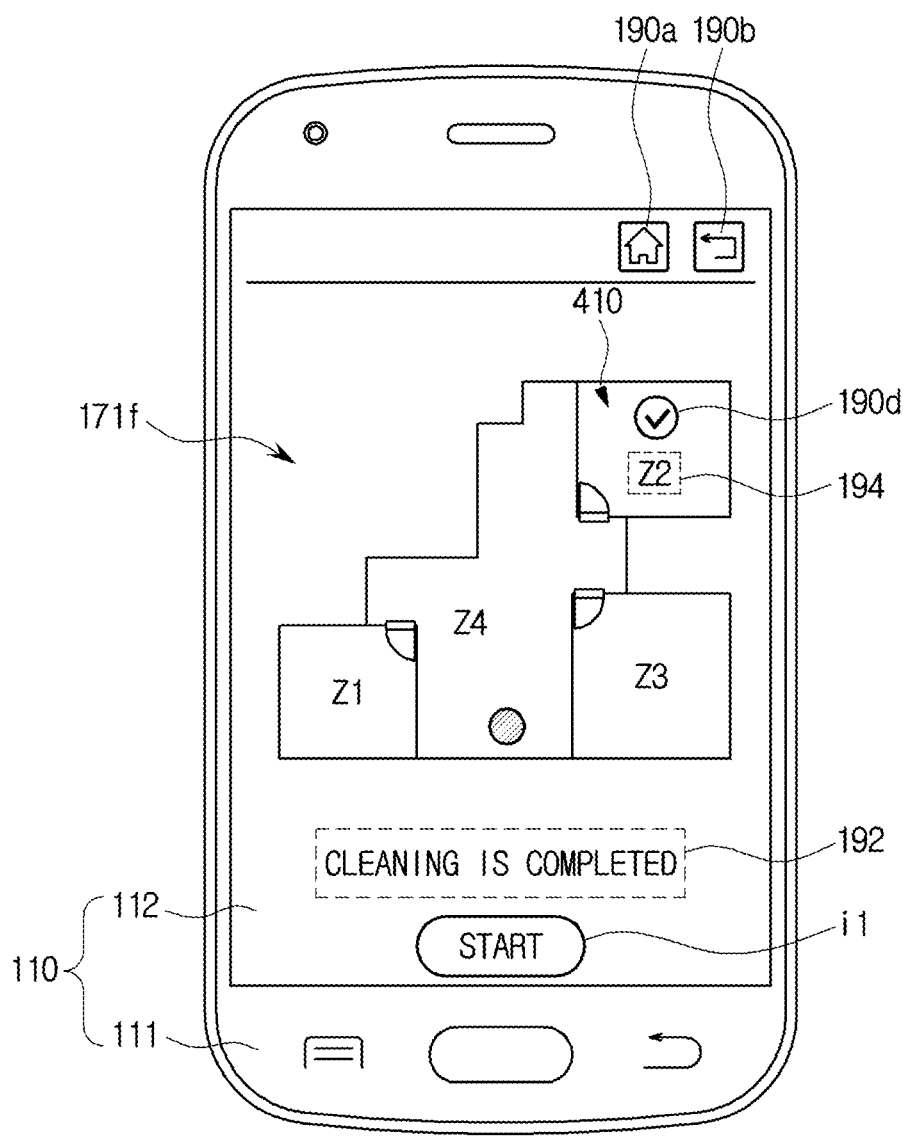

In a case in which the remote device communication unit 120 receives the "cleaning completed" state value as the current state value of the main device 200 from the main device communication unit 220, as illustrated in FIG. 15, the remote device UI 110 may display a "cleaning completed" icon (for example, a check icon), which indicates that cleaning is completed, above the name 194 of the designated region 410. In a case in which cleaning is completed, the remote device UI 110 may re-change the outline display attribute of the designated region 410 on the map image 171c-2 or change the outline display attribute to correspond to that prior to a divided region being designated.

The remote device UI 110 may also display a message 192, which indicates that the main device 200 has completed cleaning.

Figure 16:
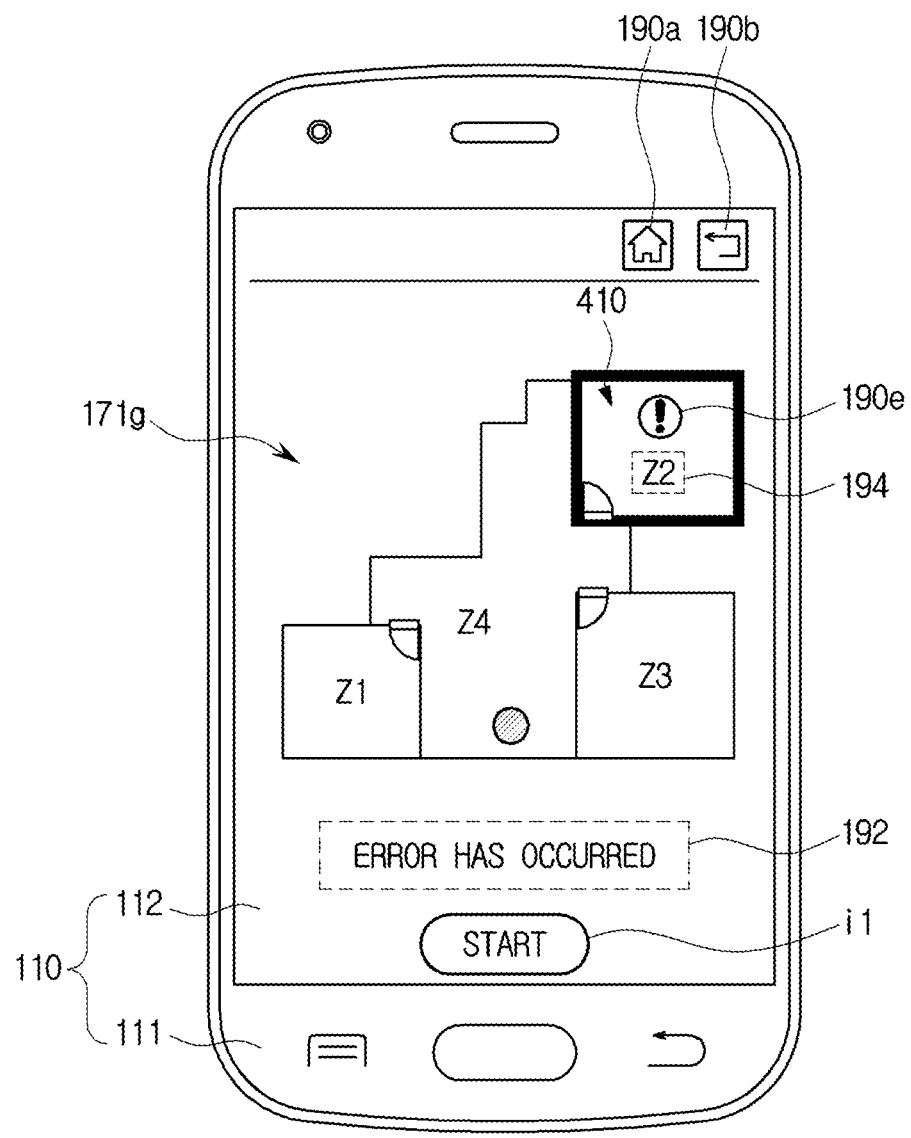

In a case in which a movement environment is determined to be different from a map image or is determined to not be possible for the main device 200 to move or perform cleaning therein while the main device 200 is moving or performing cleaning, the main device communication unit 220 may transmit a state value, which indicates that cleaning is not possible, to the remote device communication unit 120 as illustrated in FIG. 16. In a case in which the remote device communication unit 120 has received such a state value, the remote device UI 110 may display an "error occurrence" icon (for example, an exclamation mark icon), which indicates that an error has occurred.

The remote device UI 110 may also display a message 192, which notifies the user of the occurrence of an error.

Although the outline display attribute of the designated region 410 being changed in accordance with the current state value of the main device 200 has been described as an example in the above-described embodiment, a display attribute of the name 194 of the designated region 410 may also be changed.

Figure 17:
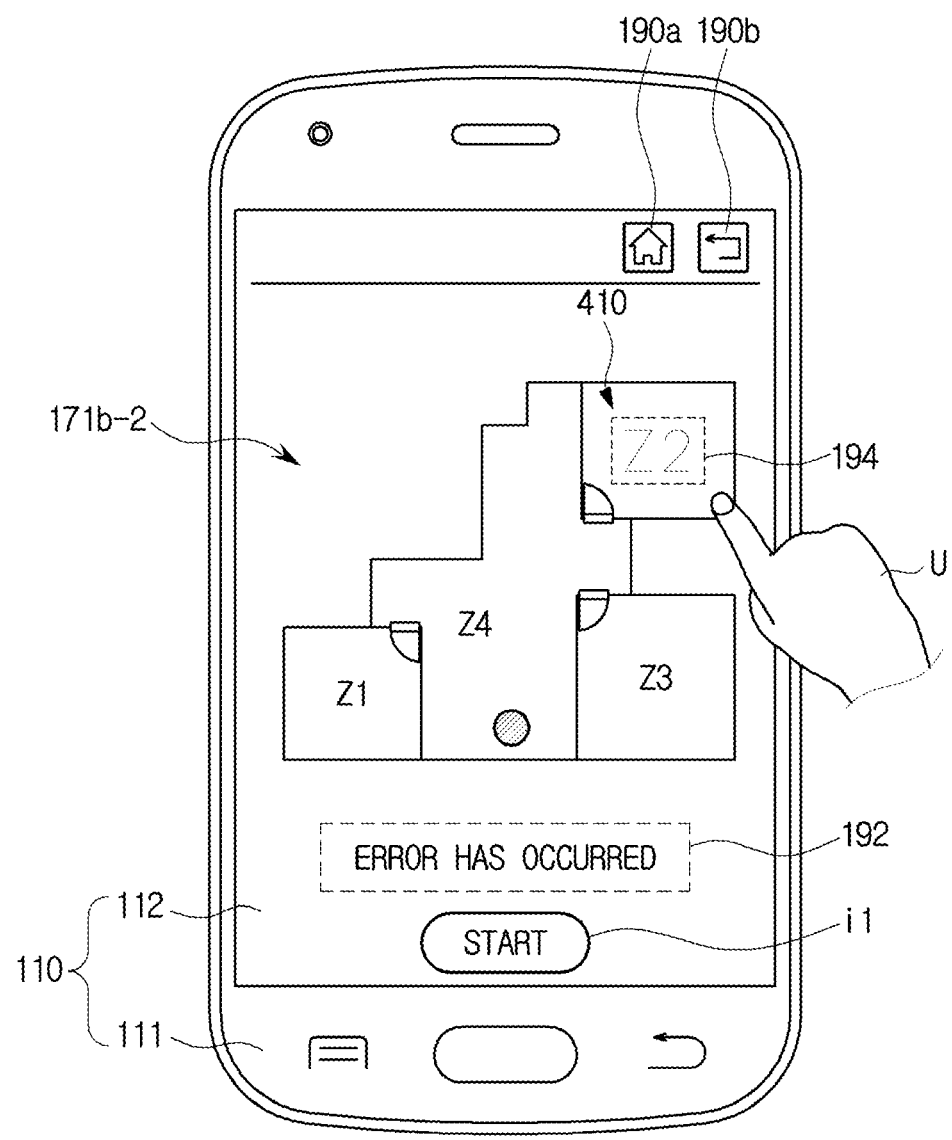
FIGS. 17 and 18 are conceptual views of screens of a UI according to another embodiment.
Figure 18:
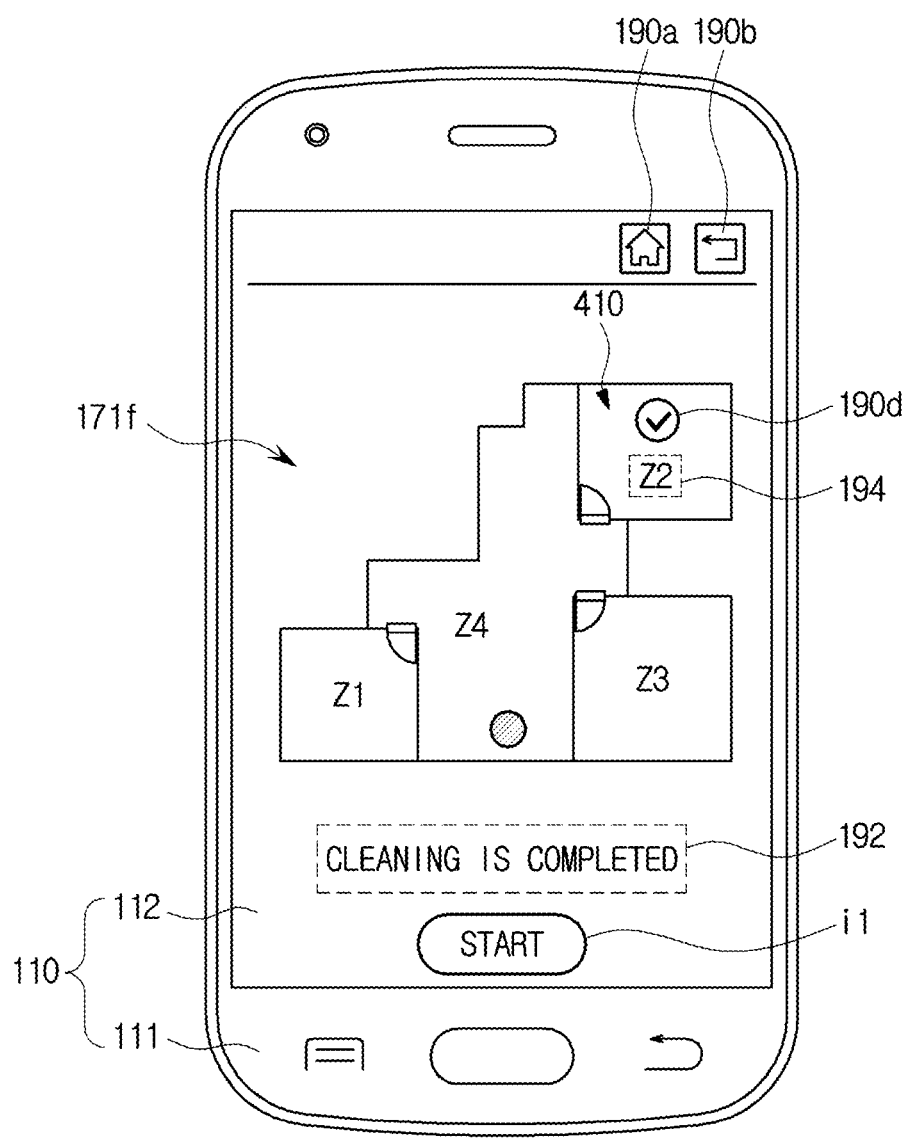

FIGS. 17 and 18 are conceptual views of screens of a UI according to another embodiment. FIG. 17 illustrates a screen through which a designate divided region command is received, and FIG. 18 illustrates a screen displayed in a case in which cleaning is completed.

Referring to FIG. 17, in a case in which a user U designates a second region 410, a remote device UI 110 may change a display attribute of the name of the designated region 410 by displaying a name 194 of the second region 410 in a different color or displaying (171b-2) the name 194 in bold font so that the second region 410, which is the designated region 410, is differentiated from the other divided regions.

In a case in which a main device 200 is moving, the remote device UI 110 may re-change a name display attribute of the designated region 410 on a map image 171c-2 and may also change the name display attribute to correspond to that prior to a divided region being designated. The name display attribute may also be re-changed in a case in which the remote device communication unit 120 receives the "cleaning completed" state value as the current state value of the main device 200 from a main device communication unit 220 as illustrated in FIG. 18.

Although it has been disclosed in the above-described embodiment that the user U specifies only one divided region using his or her finger, the user U may also specify and designate a plurality of divided regions on a map image and a cleaning order of the plurality of divided regions.

Figure 19:
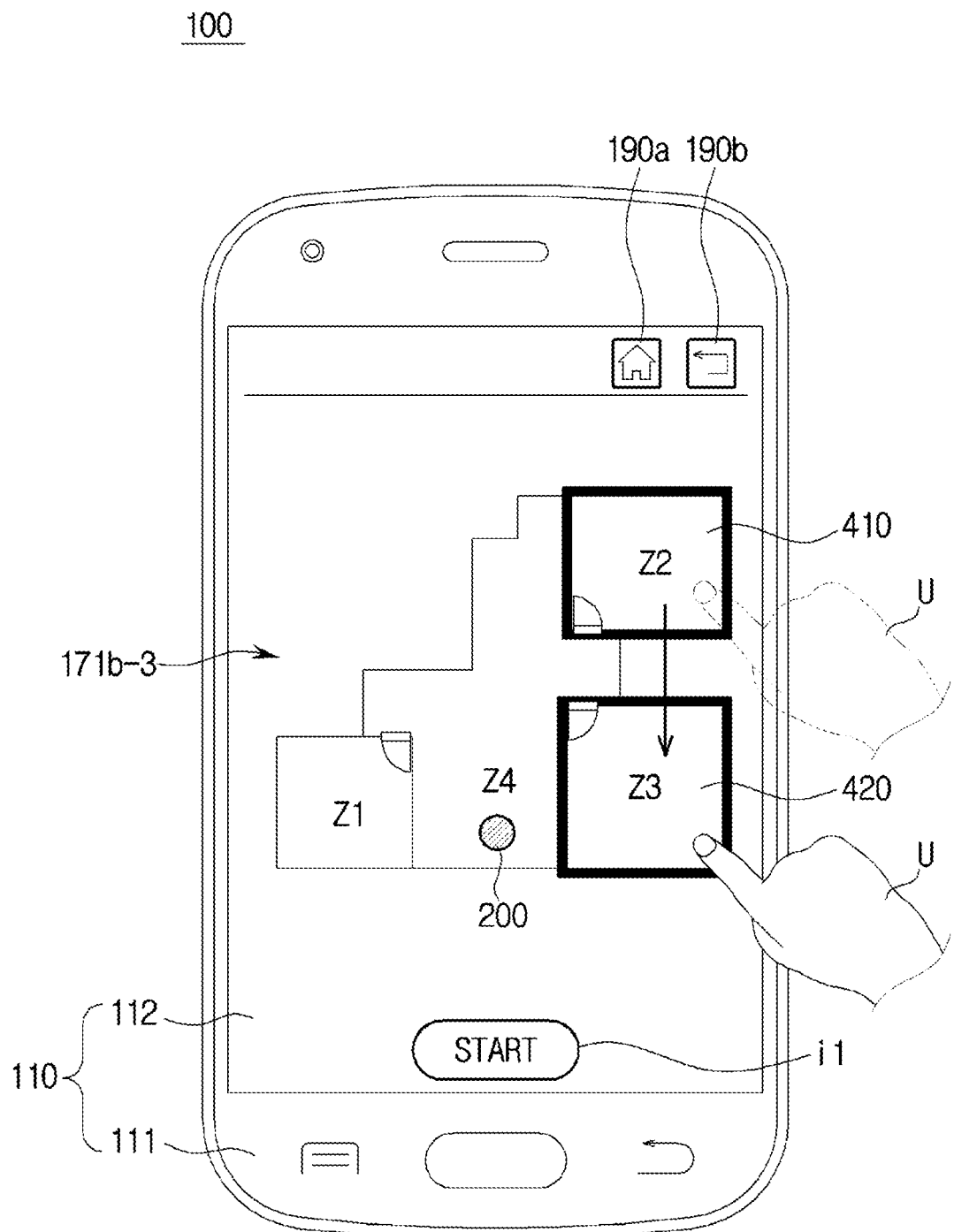
FIG. 19 is a conceptual diagram of a screen through which commands for specifying and designating a plurality of divided regions and a cleaning order of the plurality of divided regions are received.

FIG. 19 is a conceptual diagram of a screen through which commands for specifying and designating a plurality of divided regions and a cleaning order of the plurality of divided regions are received.

Referring to FIG. 19, a remote device UI 110 may sequentially receive designations of a plurality of divided regions 410 and 420 from a user U, and an order in which the plurality of divided regions 410 and 420 are designated may be stored in a remote device storage unit 140.

In a case in which the user U designates the plurality of divided regions 410 and 420 and an order thereof (410->420) and inputs a start cleaning command, a main device 200 may receive information on the designated divided regions 410 and 420 and the order in which the divided regions are designated, generate a movement path in accordance with the designation order, and move and perform cleaning along the movement path.

Even in a case in which the user U designates only the plurality of divided regions 410 and 420 and does not designate a cleaning order thereof, a main device controller 230 may generate a movement path in accordance with a pre-stored cleaning order (for example, 410->420) and control the main device 200 to move and perform cleaning along the generated movement path. In this case, the remote device UI 110 may display the generated movement path.

For example, the cleaning order may be set to be clockwise or counterclockwise from a divided region that is the closest to the current position of the main device 200 or from a divided region that is the farthest from the current position of the main device 200, may be set to be from the largest divided region to the smallest divided region, may be set to be from the smallest divided region to the largest divided region, or may be set to be from a divided region that is the most adjacent to the current position of the main device 200. In this way, various methods may be employed.

Figure 20:
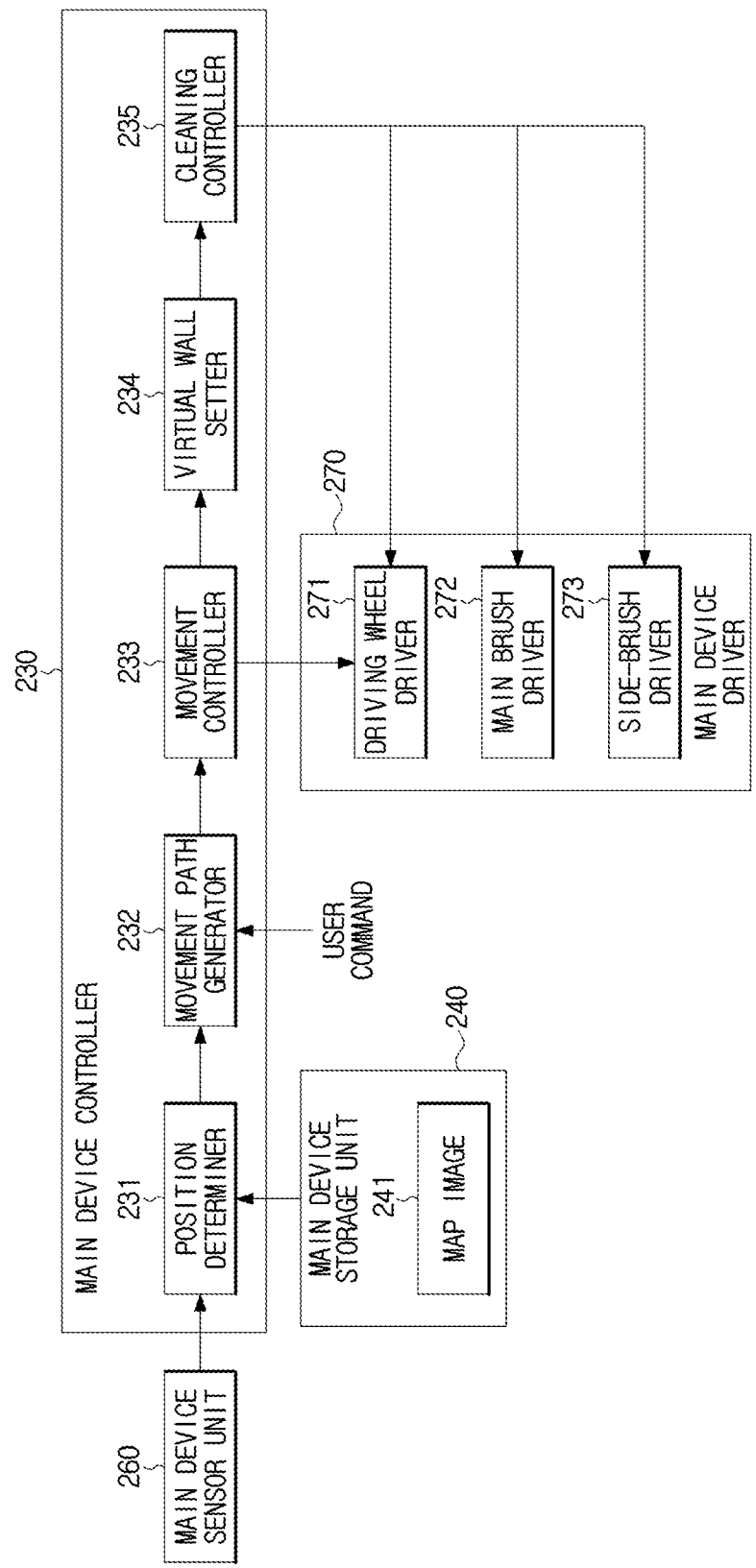
FIG. 20 is a detailed control block diagram of the main device according to one embodiment.

Hereinafter, a process in which the main device 200 generates a movement path and moves and performs cleaning along the generated movement path will be described in detail with reference to FIG. 20. FIG. 20 is a detailed control block diagram of the main device according to one embodiment.

Referring to FIG. 20, a main device 200 may include a main device sensor unit 260, a main device storage unit 240, a main device controller 230, and a main device driver 270.

The main device sensor unit 260 may recognize a position of the main device 200 through movement of the main device 200 in a space to be cleaned in which the main device 200 is present, and transmit the position information to the main device controller 230. Since detailed descriptions related to the main device sensor unit 260 have been given above with reference to FIG. 3, repetitive descriptions will be omitted.

The main device storage unit 240 stores a map image 241 including one or more divided regions. In this case, the main device storage unit 240 may store the map image 241 generated by the "generate map" command of the user.

The main device storage unit 240 may store a program for generating a movement path or store the map image 241 downloaded from the outside. Since detailed descriptions related to the main device storage unit 240 have been given above with reference to FIG. 3, repetitive descriptions will be omitted.

The main device controller 230 may include a position determiner 231, a movement path generator 232, a movement controller 233, a virtual wall setter 234, and a cleaning controller 235.

On the basis of position information of the main device 260 received from the main device sensor unit 260 and the map image 241 stored in the main device storage unit 240, the position determiner 231 matches the current position of the main device 200 with the map image 241.

The movement path generator 232 selects a divided region to which the main device 200 moves in accordance with a user command and sets a target point to which the main device 200 moves within the selected divided region. Then, the movement path generator 232 sets a path along which the main device 200 moves to the target point.

According to one embodiment, the target point to which the main device 200 moves is a point at which the main device 200 is the most likely to be actually present within the divided region selected by the user. The target point to which the main device 200 moves may be a central point of the divided region or a point farthest from surrounding obstacles within the divided region. The target point to which the main device 200 moves will be described below with reference to FIG. 23.

Since the generation of a path along which the main device 200 moves has been described above, repetitive descriptions will be omitted.

The movement controller 233 controls a driving wheel driver 271 of the main device driver 270 to allow the main device 200 to move to the target point along the generated movement path.

In a case in which the main device 200 is present at the target point, the virtual wall setter 234 generates a virtual wall around the selected divided region. At the virtual wall, an entry of the main device 200 is restricted. For example, the virtual wall may be set in the vicinity of a region dividing point of the divided region.

The virtual wall setter 234 may also set a virtual wall in accordance with a user command.

A detailed control process of the virtual wall setter 230 will be described below with reference to FIGS. 24 to 28.

The cleaning controller 235 controls the main device 200 to perform cleaning.

Specifically, the cleaning controller 235 may control the driving wheel driver 271 of the main device driver 270 to allow the main device 200 to travel, and may control the main brush driver 272 and a side-brush driver 273 to allow the main device 200 to perform cleaning while traveling.

According to one embodiment, the cleaning controller 235 may allow the driving wheel driver 271 to perform autonomous traveling. In this case, since an actual space to be cleaned in which the main device 200 is present is similar to the map image 241 stored in the storage unit 240, the main device 200 may perform cleaning within the divided region intended by the user by partitions surrounding the divided region of the actual space to be cleaned and the virtual wall set by the virtual wall setter 230.

In this way, in a case in which the main device 200 starts autonomous traveling from the target point, since the main device 200 performs cleaning throughout the entire divided region of the actual space to be cleaned even in a case in which the main image and the actual space to be cleaned do not exactly match each other, i.e., even when a position recognition error occurs in the main device 200, the actual space to be cleaned may be thoroughly cleaned.

In a case in which a virtual wall is set at a region dividing point, since movement of the main device 200 at the virtual wall is restricted even when the main device 200 approaches the region dividing point while performing autonomous traveling, the main device 200 may be prevented from moving out of the divided region intended by the user.

Figure 21:
FIG. 21 is a control block diagram of a virtual wall setter, a virtual region setter.

According to another embodiment, the main device controller 230 may further include a virtual region setter configured to set a virtual region. FIG. 21 is a control block diagram of a virtual wall setter, a virtual region setter, and a cleaning controller of the main device controller 230 according to the other embodiment.

A virtual region setter 236 may set a virtual region having a boundary spaced a preset reference distance apart from a divided region on a map image selected by the user. The virtual region allows the main device 200 to thoroughly perform cleaning within the divided region of the actual space to be cleaned even when there is an error between the divided region of the actual space to be cleaned and a divided region of the map image. The virtual region may be a space within a virtual wall forming a closed loop.

In this case, the cleaning controller 235 may allow the driving wheel driver 271 to perform autonomous traveling within the virtual region set by the virtual region setter 236 and allow the main brush driver 272 and the side-brush driver 273 to perform cleaning while traveling.

In a case in which the virtual region is set, since movement of the main device 200 is restricted to be within the virtual region, the main device 200 may be prevented from moving out of the divided region intended by the user.

The cleaning controller 235 may also allow the driving wheel driver 271 to perform autonomous traveling outside the virtual region set by the virtual region setter 236 and allow the main brush driver 272 and the side-brush driver 273 to perform cleaning while traveling. Here, whether autonomous traveling is performed within the virtual region or outside the virtual region may be selected by the user through UI. The virtual region setter 236 may also set the virtual region in accordance with a user command. A method of setting the virtual region in accordance with a user command will be described below with reference to FIG. 27.

Hereinafter, a detailed process in which the movement path generator 232 of the main device controller 230 generates the movement path, the virtual wall setter 234 sets the virtual wall, and the virtual region setter 235 sets the virtual region according to one embodiment will be described with reference to FIGS. 22 to 28.

Figure 22:
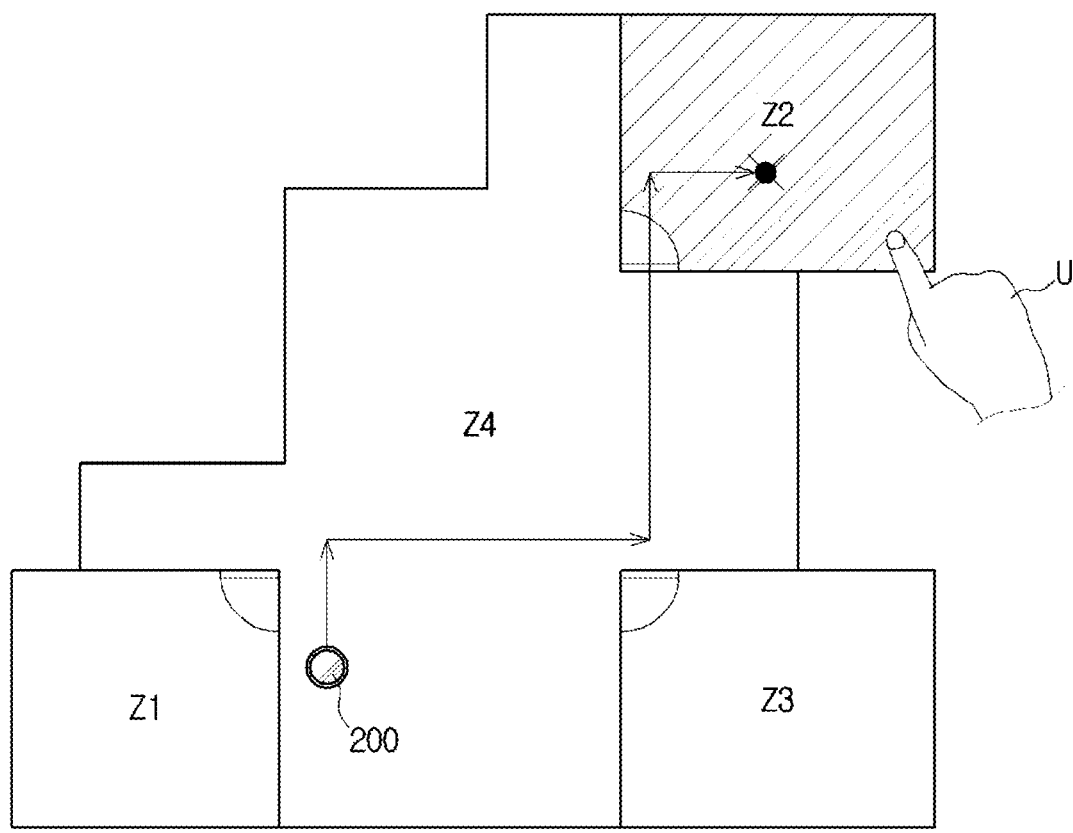
FIGS. 22 and 23 are exemplary views for describing a method of setting a movement path of a main device set by a movement path generator and a target point of the main device.
Figure 23:
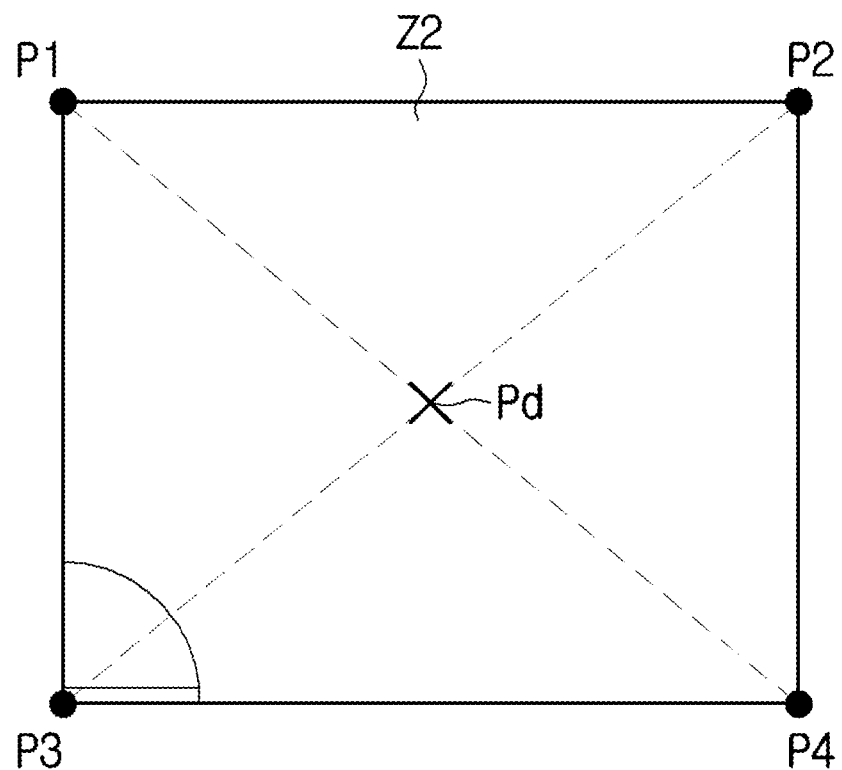

FIGS. 22 and 23 are exemplary views for describing a method of setting a movement path of a main device set by a movement path generator and a target point of the main device.

Referring to FIG. 22, for a main device 200 to move to the divided region Z2, which is designated in accordance with a user command, from a point on a map image at which the main device 200 is currently present, a movement path generator 232 sets a target point within the designated divided region Z2.

For moving the main device 200 to the target point, the movement path generator 232 may set a movement path so that the main device 200 moves upward by a first distance, moves rightward by a second distance, moves upward again by a third distance, and then moves rightward by a fourth distance. Since a method of setting the first to fourth distances as the shortest possible distances is a known technique, descriptions thereof will be omitted.

In this case, a remote device UI 110 may display a position of the main device 200 in real time and also display a generated movement path.

Referring to FIG. 23, a target point Pd may be a central point of a divided region Z2 selected by a user from a map image, or may be a point farthest from surrounding obstacles P1 to P4 within the divided region Z2.

The target point Pd may also be a point that is the closest to the central point of the divided region Z2 selected by the user from the map image and farthest from surrounding obstacles P1 to P4 within the divided region Z2.

The target point Pd may also be any one point that is present within the divided region Z2 selected by the user from the map image and the closest to the current position of the main device 200. In addition, the target point Pd may also be various other points within the divided region Z2.

Figure 24:
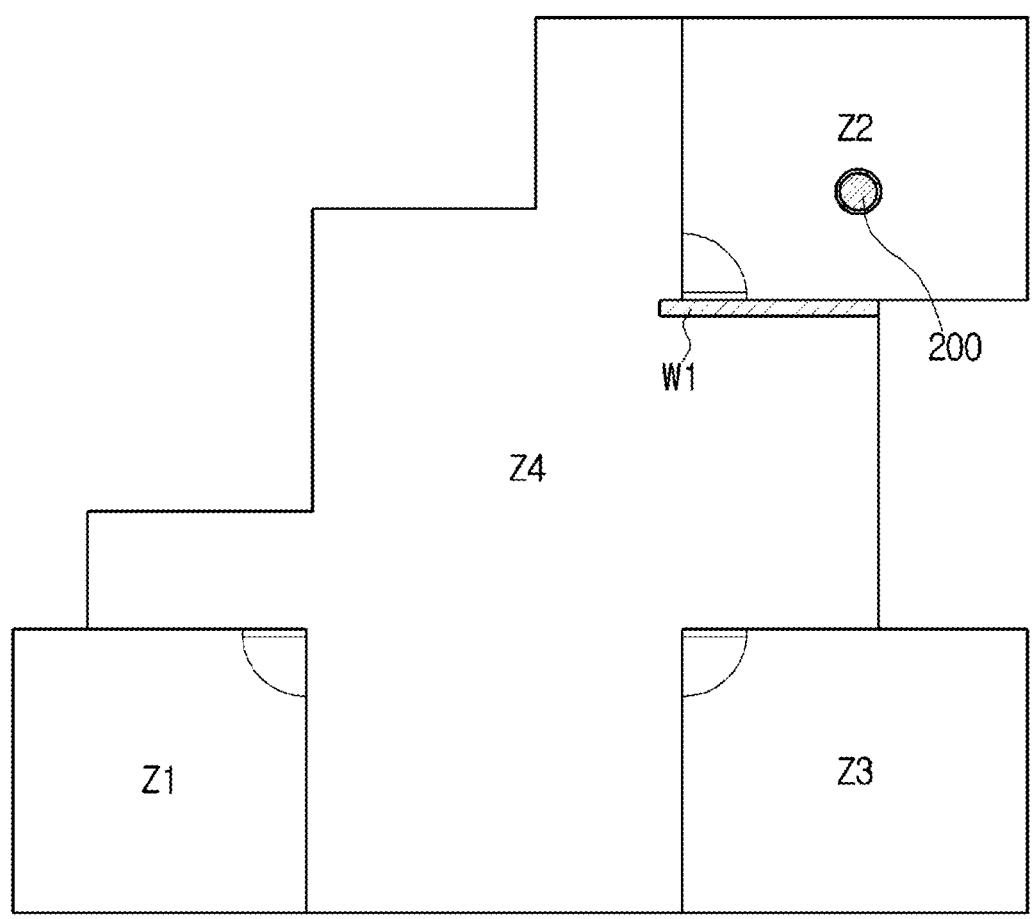
FIG. 24 is an exemplary view of a virtual wall set by a virtual wall setter.
Figure 25:
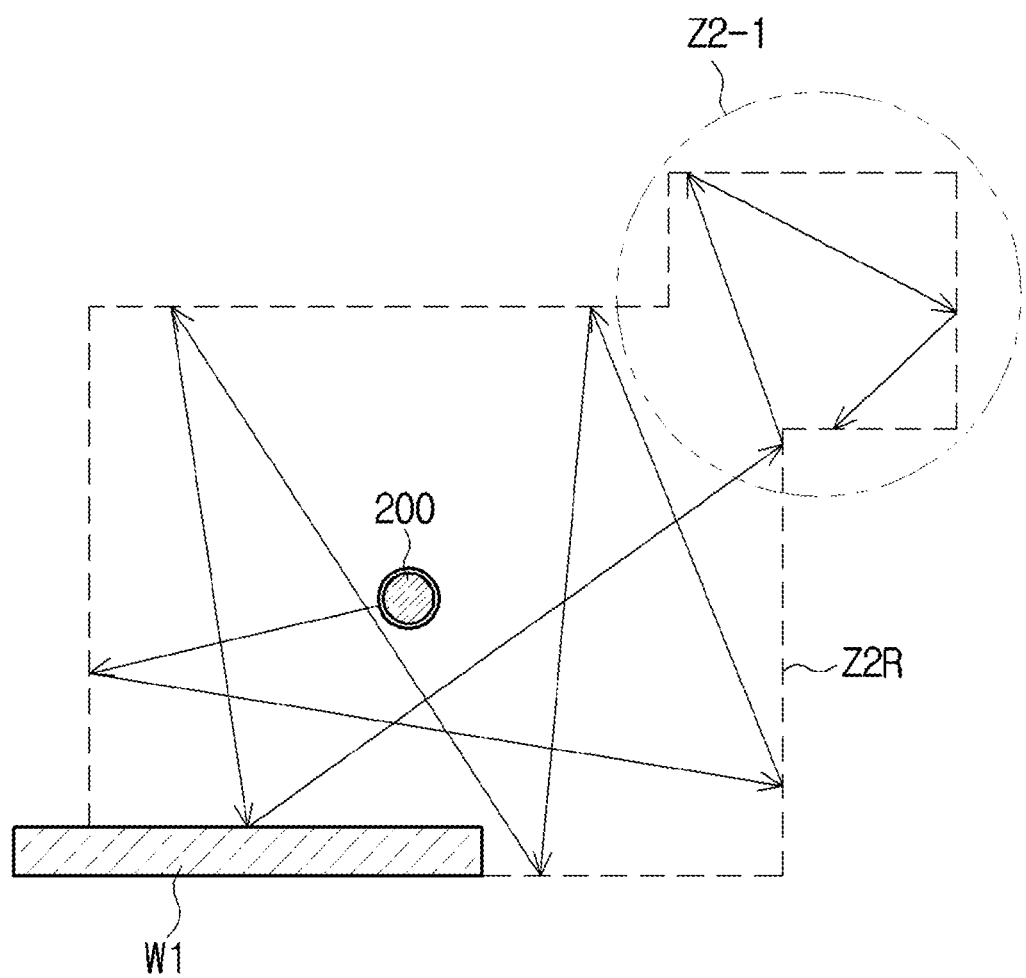
FIG. 25 is a view for describing a process in which a main device performs cleaning in a divided region of an actual space to be cleaned in a case in which the virtual wall is set.

FIG. 24 is an exemplary view of a virtual wall set by a virtual wall setter, and FIG. 25 is a view for describing a process in which a main device performs cleaning in a divided region of an actual space to be cleaned in a case in which the virtual wall is set.

Referring to FIG. 24, a virtual wall setter 234 may set a virtual wall W1 in the vicinity of a region dividing point corresponding to a divided region Z2 selected by a user from the map image. The virtual wall W1 may include a point at which the region dividing point is formed.

Referring to FIG. 25, after a virtual wall W1 is set, a cleaning controller 235 may control a main device 200 to perform autonomous traveling and cleaning, and the main device 200 may thoroughly perform cleaning within the region intended by a user by a partition Z2R that surrounds a divided region of the actual space to be cleaned and the virtual wall W1, which is set by a virtual wall setter 234.

As an example, in a case in which cleaning is performed in a specific divided region Z2-1, which was not sensed due to an obstacle when a map image was generated, after the obstacle is removed therefrom, the main device 200 may also perform cleaning in the specific divided region Z2-1 by autonomous traveling.

In a case in which the main device 200 performs cleaning while autonomously traveling in real time, a cleaning controller 236 may remove a path through which the main device 200 has already passed in real time.

Figure 26:
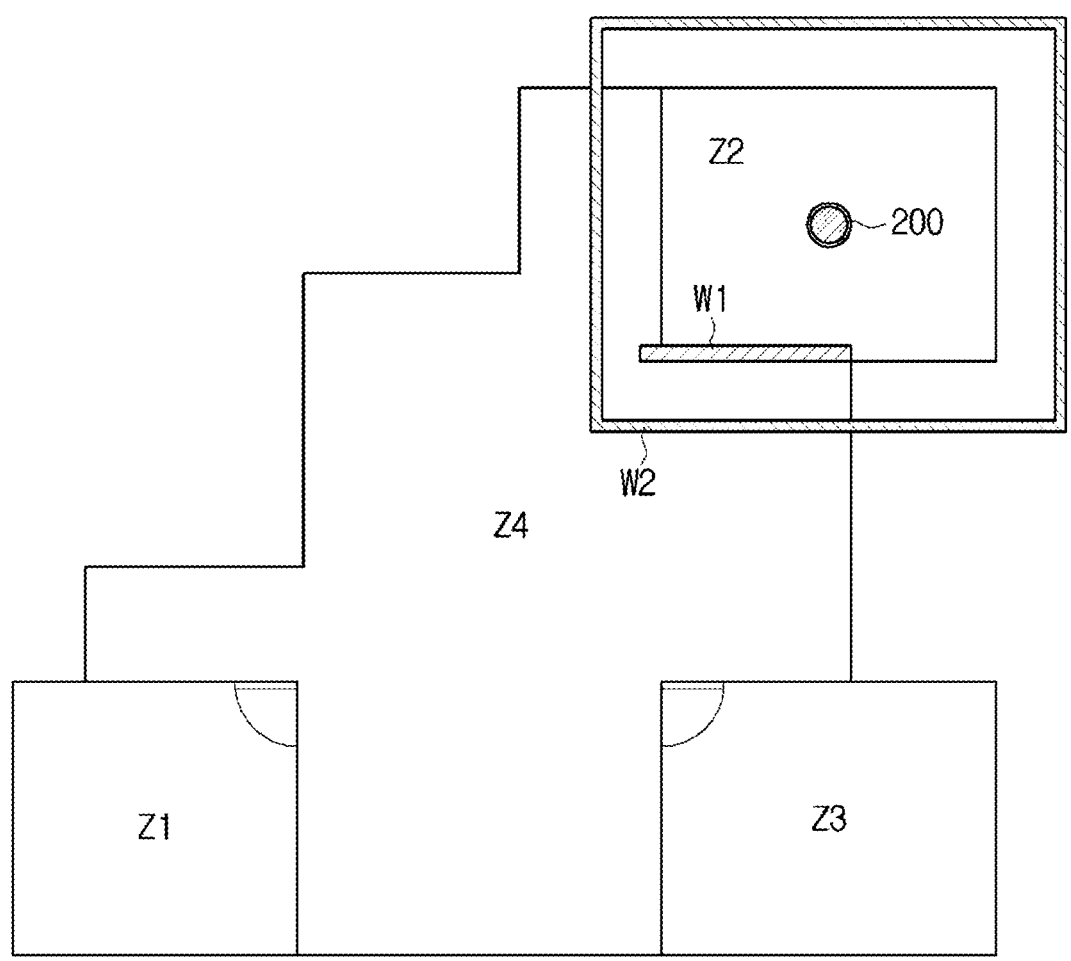
FIGS. 26 and 27 are exemplary views of a virtual region set by a virtual region setter automatically or manually.
Figure 27:
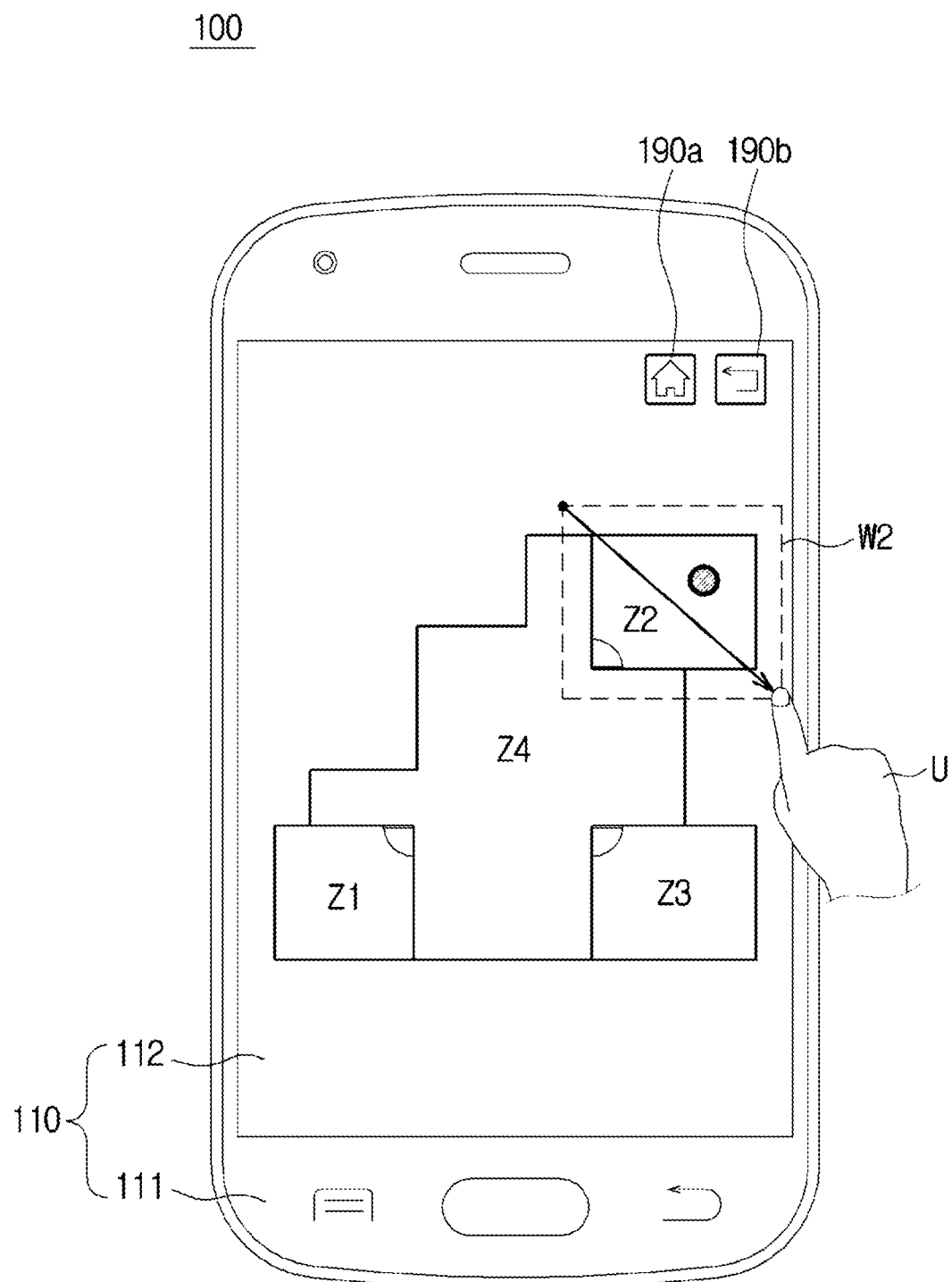

The main device controller 230 according to another embodiment may further include the virtual region setter 236. FIGS. 26 and 27 are exemplary views of a virtual region set by a virtual region setter automatically or manually.

Referring to FIG. 26, a virtual region setter 236 may set a virtual region W2 having a boundary spaced a preset reference distance (e.g., 30 cm) apart from a divided region Z2 selected by the user from the map image. In this case, in accordance with control of a cleaning controller 235, a main device 200 autonomously travels and performs cleaning within the virtual region W2 set by the virtual region setter 236.

Even in this case, the cleaning controller 235 may restrict movement of the main device 200 at a virtual wall W1 in a case in which the main device 200 approaches the virtual wall W1 set by a virtual wall setter 234. In a case in which the virtual region W2 is generated, the virtual wall W1 set by the virtual wall setter 234 may also be removed.

Referring to FIG. 27, a virtual region setter 236 may also set a virtual region manually in accordance with a user command.

By performing drag-and-drop from any one point of a map image displayed on a remote device UI 110 to another point thereon, a user U may designate a virtual region forming a certain figure. In accordance with control of the cleaning controller 235, the main device 200 may autonomously travel and perform cleaning within the virtual region W2 set by the virtual region setter 236.

In addition, the user U may also designate the virtual region by a method of drawing a closed loop at any one point of the map image displayed on the remote device UI 110.

Although it has been described in the above-described embodiment that only the virtual region W2 is set in accordance with a user command, the virtual wall W1 may also be set in accordance with a user command. In addition, a plurality of virtual walls W1 may be set.

Figure 28:
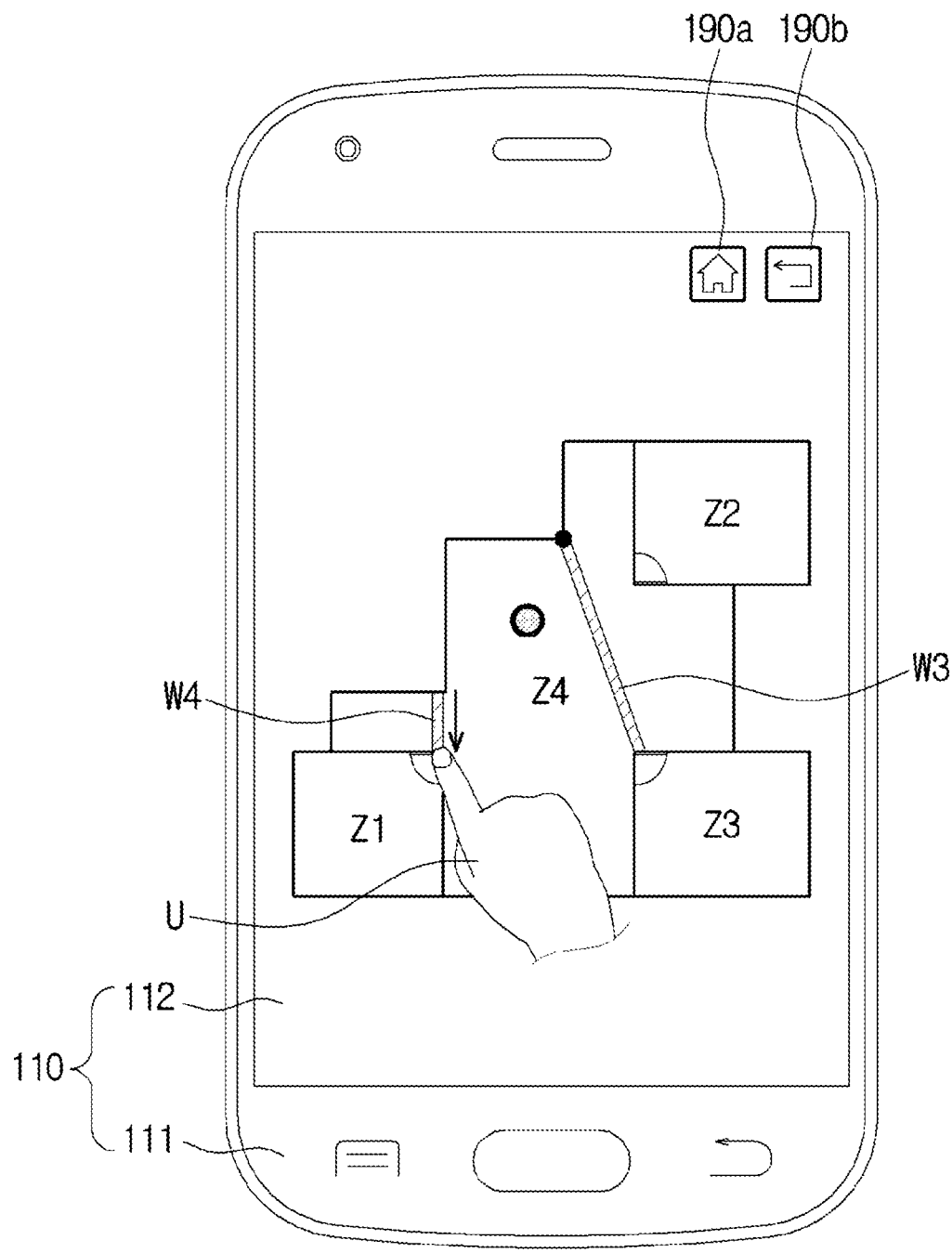
FIG. 28 is an exemplary view of a plurality of virtual walls set in accordance with a user command.

FIG. 28 is an exemplary view of a plurality of virtual walls set in accordance with a user command.

By performing drag-and-drop from any one point of a map image displayed on a remote device UI 110 to another point thereon, a user U may designate virtual walls W3 and W4 formed in a straight line or a curve on the map image.

The plurality of virtual walls W3 and W4 may be designated.

In this case, a main device 200 may autonomously travel in accordance with control of a cleaning controller 235, but in a case in which the main device 200 approaches any one of the plurality of virtual walls W3 and W4, traveling of the main device 200 to the corresponding virtual wall W3 or W4 may be restricted.

In a case in which it is determined that the main device 200 has completed traveling in all paths, the cleaning controller 235 controls a main device driver 270 to stop traveling, and a movement path generator 232 removes a virtual wall and a virtual region.

The movement path generator 232 sets a target point in the next divided region in accordance with a set cleaning order, and generates a movement path to the target point.

Like the target point described above, the target point in the next divided region may also be at least one of a central point of the divided region, a point farthest from surrounding obstacles, and any one point that is present within the next divided region and the closest to the current position of the main device 200.

Although it has been described in the above-described embodiment that a position determiner 231, the movement path generator 232, the movement controller 233, a virtual wall setter 234, the cleaning controller 235, and the virtual region setter 236 are implemented as separate modules that implement different functions, embodiments are not necessarily limited thereto, and at least two or more of the position determiner 231, the movement path generator 232, the movement controller 233, the virtual wall setter 234, the cleaning controller 235, and the virtual region setter 236 may be implemented in a single module. In addition, although it has been described in the above-described embodiment that the position determiner 231, the movement path generator 232, the movement controller 233, the virtual wall setter 234, the cleaning controller 235, and the virtual region setter 236 are implemented in the main device 200, each of the elements may also be implemented in a remote device 100, and in this case, sensor values of the main device sensor unit 260 and a control signal for controlling the main device driver 270 may be transmitted and received through the remote device communication unit 120 and the main device communication unit 220.

Figure 29:
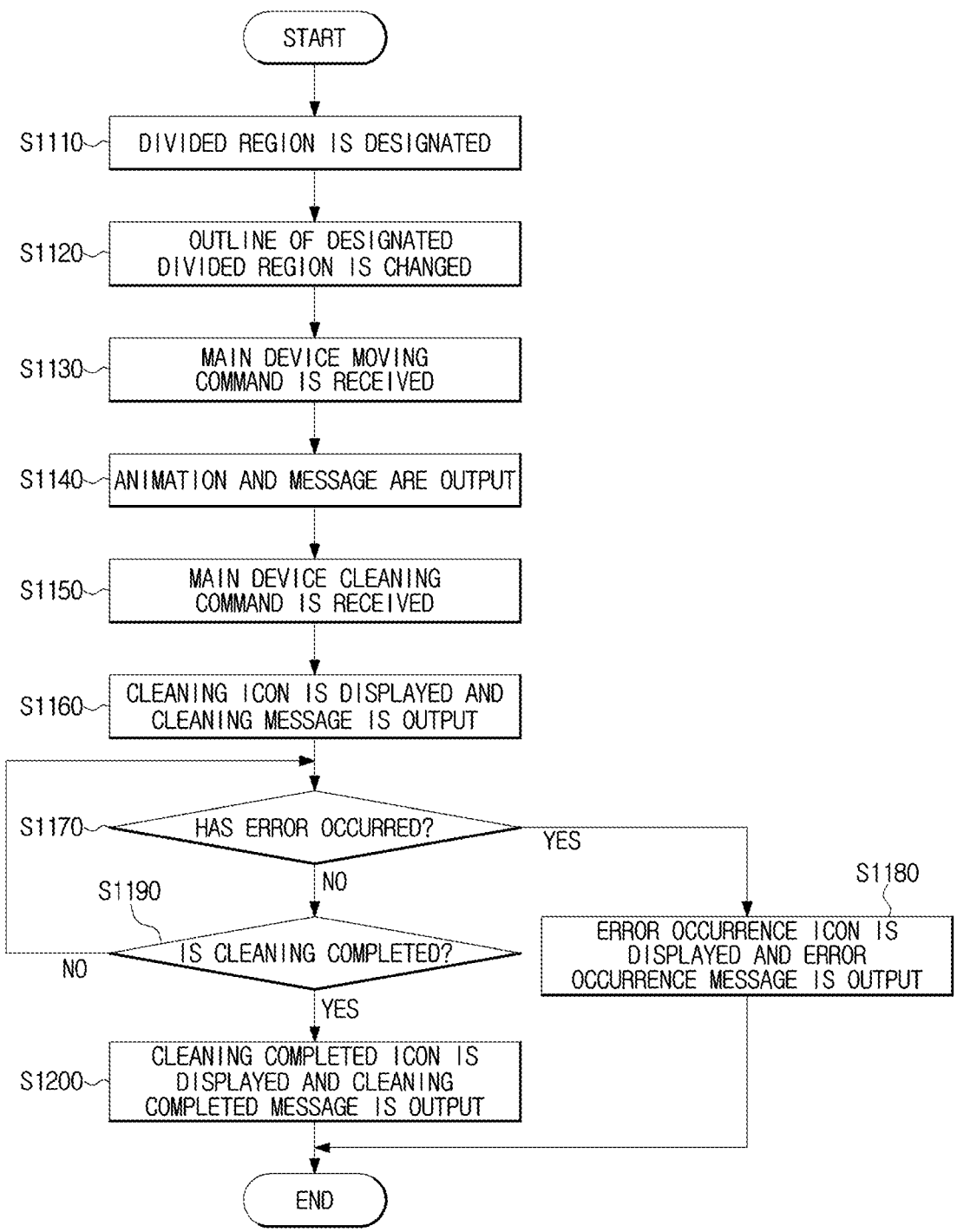
FIG. 29 is a flowchart of a method of controlling the cleaning robot according to one embodiment.

Hereinafter, a method of controlling the cleaning robot 1 according to one embodiment will be described with reference to FIG. 29. FIG. 29 is a flowchart of a method of controlling the cleaning robot according to one embodiment.

The reference numerals of the elements described with reference to FIGS. 1 to 28 will be referenced for reference numerals of the elements of the cleaning robot 1 which will be described with reference to FIG. 29.

In a method of controlling a cleaning robot 1 according to one embodiment, at least one divided region is designated by a user (S1110).

The designating of the divided region may be performed by a remote device input unit 111 of a remote device UI 110.

In the method of controlling the cleaning robot 1, a plurality of divided regions may be designated by a user, and in this case, a remote device controller 130 may store an order in which the divided regions are designated in a remote device storage unit 140.

Next, in the method of controlling the cleaning robot 1 according to one embodiment, an outline display attribute of the designated divided region is changed (S1120). In the method of controlling the cleaning robot 1 according to another embodiment, a name display attribute of the designated divided region may be changed.

As an example, the changing of the outline display attribute may include changing color of the outline of the designated region or displaying the outline in bolt font, and the changing of the name display attribute may include changing color of a displayed name or displaying the name in bold font.

The changing of the outline display attribute or the name display attribute of the divided region includes changing an outline or name of a designated region displayed on a remote device display unit 112 by the remote device controller 130.

Next, in the method of controlling the cleaning robot 1 according to one embodiment, a main device moving command is received from a user (S1130).

The receiving of the main device moving command may include receiving a "start cleaning" command from the user by a remote device input unit 111. A separate start moving command may also be received in accordance with an implementation form of an application.

Next, in the method of controlling the cleaning robot 1 according to one embodiment, an animation and a message, which indicate that the main device 200 is moving, are output (S1140).

In a case in which the remote device communication unit 120 receives a "moving" state value from the main device 200, the outputting of the animation and message may include displaying a translucent layer over a map image by the remote device display unit 112 and displaying an animation from which the user may intuitively recognize that the main device 200 is moving.

In a case in which the remote device communication unit 120 receives the "moving" state value from the main device 200, the remote device display unit 112 may also display a movement path of the main device 200.

The outputting of the animation and message may include re-changing the outline display attribute of the designated divided region. The outputting of the animation and message may include re-changing the name display attribute of the designated divided region.

As an example, the re-changing of the outline display attribute may include restoring the outline display attribute of the designated region to that prior to changes being made, and the re-changing of the name display attribute may include restoring the name display attribute of the designated region to that prior to changes being made. However, the re-changing of the outline display attribute or the name display attribute may also be performed in a case in which a "cleaning completed" state value is received, which will be described below.

Next, in the method of controlling the cleaning robot 1 according to one embodiment, a main device cleaning command is received from a user (S1150).

In a case in which receiving a main device moving command includes receiving the "start cleaning" command from the user, the receiving of the main device cleaning command may be omitted.

The receiving of the main device cleaning command from the user may be performed by the remote device input unit 111.

Next, in the method of controlling the cleaning robot 1 according to one embodiment, an icon, which indicates that the main device 200 is performing cleaning, is displayed, and a message indicating the same is output (S1160).

In a case in which the remote device communication unit 120 receives the "cleaning" state value from the main device 200, the displaying of the icon may include displaying a "cleaning" icon (for example, a hollow circular icon) above the name of the designated region by the remote device display unit 112. In addition, the displaying of the icon may include displaying the "cleaning" icon in the form of an animation that moves within a designated region 410.

Next, in the method of controlling the cleaning robot 1 according to one embodiment, whether an error has occurred in the main device 200 is determined (S1170).

The determining of whether an error has occurred includes receiving an "error occurrence" state value from the main device 200.

Next, in the method of controlling the cleaning robot 1 according to one embodiment, in a case in which an error has occurred, i.e., the error occurrence state value is received, the "error occurrence" icon is displayed and an error occurrence message is output (S1180).

The displaying of the error occurrence icon may include, for example, displaying an exclamation mark icon above the name of the divided region in which an error has occurred.

Next, in the method of controlling the cleaning robot 1 according to one embodiment, in a case in which an error did not occur, i.e., the error occurrence state value is not received, whether cleaning is completed is determined (S1190).

The determining of whether cleaning is completed includes receiving a "cleaning completed" state value from the main device 200 by the remote device communication unit 120.

Next, in the method of controlling the cleaning robot 1 according to one embodiment, in a case in which cleaning is completed, i.e., the cleaning completed state value is received, a "cleaning completed" icon is displayed, and a cleaning completed message is output (S1200).

The displaying of the cleaning completed icon may include, for example, displaying a check icon above the name of the divided region in which cleaning is completed.

In the method of controlling the cleaning robot 1 according to one embodiment, in a case in which cleaning is not completed, i.e., the cleaning completed state value is not received, the determining of whether an error has occurred (S1170) is performed again.

Although the case in which any one divided region is designated has been described in the above-described embodiment, a plurality of divided regions may be designated by the user, and a cleaning order of the divided regions may be designated. In this case, in the method of controlling the cleaning robot 1, the main device may be allowed to move and perform cleaning in accordance with the designated cleaning order, and various remote device UIs 110 may be implemented in accordance with a user command or a state value of the main device 200.

Figure 30:
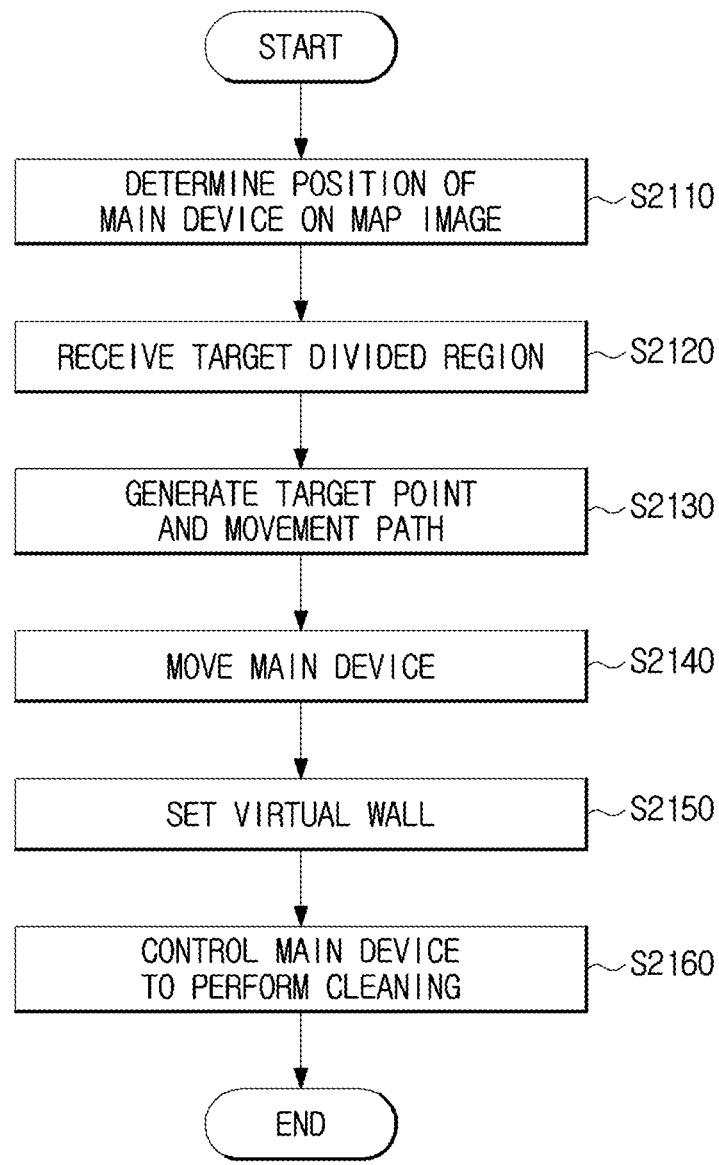
FIG. 30 is a flowchart of a method of controlling the cleaning robot according to another embodiment.

Hereinafter, a method of controlling the cleaning robot 1 according to another embodiment will be described with reference to FIG. 30. FIG. 30 is a flowchart of a method of controlling the cleaning robot according to another embodiment.

The reference numerals of the elements described with reference to FIGS. 1 to 28 will be referenced for reference numerals of the elements of the cleaning robot 1 which will be described with reference to FIG. 30.

In a method of controlling a cleaning robot 1 according to another embodiment, position information related to the current position of a main device 200 is received from a main device sensor unit 260, and a current position of the main device 200 is matched with a map image (S2110).

In this case, the map image may be pre-stored in a main device storage unit 240 or pre-stored in a remote device storage unit 140. The map image includes information on one or more divided regions and information on a region dividing point of each divided region.

For example, in a case in which a space to be cleaned is a home, a divided region may correspond to a room, and a region dividing point may correspond to a door of the room.

The matching of the current position of the main device 200 with the map image may be performed by a position determiner 231 of a main device controller 230 or may also be performed by a remote device controller 130.

In a case in which the matching is performed by the remote device controller 130, a remote device communication unit 120 may receive position information of the main device 200 from a main device communication unit 220, and transmit the received position information to the remote device controller 130.

Then, in the method of controlling the cleaning robot 1 according to another embodiment, at least one divided region is received as a target divided region from a user through a remote device UI 110 (S2120).

Here, the remote device UI 110 may directly receive the target divided region from the user or receive a cleaning order of a plurality of divided regions.

Then, in the method of controlling the cleaning robot 1 according to another embodiment, a target point is set within the divided region selected by the user, and a movement path of the main device 200 to the set target point is generated (S2130).

The target point within the divided region selected by the user may be any one of a central point of the selected divided region, a point farthest from surrounding obstacles within the selected divided region, and any one point that is present within the selected divided region and the closest to the current position of the main device 200.

The setting of the target point and generating of the movement path may be performed by a movement path generator 232 of the main device controller 230 or may also be performed by the remote device controller 130.

In a case in which the setting of the target point and generating of the movement path are performed by the movement path generator 232 of the main device controller 230, the main device communication unit 220 may receive a user command from the remote device communication unit 120, and transmit the received user command to the movement path generator 232.

Next, in the method of controlling the cleaning robot 1 according to one embodiment, the main device 200 is moved to the target point (S2140).

In a case in which the main device 200 is moved to the target point, the main device 200 may pass through a region dividing point.

The moving of the main device 200 to the target point may be performed by a moving controller 233 of the main device controller 230 or may also be performed by the remote device controller 130.

In a case in which the moving of the main device 200 to the target point is performed by the moving controller 233 of the main device controller 230, the moving controller 233 may control the driving wheel driver 271 of a main device driver 270 to move the main device 200 along the generated movement path.

In a case in which the moving of the main device 200 to the target point is performed by the remote device controller 130, a control signal generated by the remote device controller 130 may be transmitted to the main device communication unit 220 via the remote device communication unit 120, and the main device communication unit 220 may transmit the received control signal to the driving wheel driver 271 of the main device driver 270.

Next, in the method of controlling the cleaning robot 1 according to one embodiment, in a case in which the main device 200 is present at the target point, a virtual wall is set (S2150).

For example, the virtual wall may be set to include a region dividing point of a selected divided region, i.e., a divided region on a map image in which the main device 200 is present.

The virtual wall may also be manually set in accordance with a user command.

The setting of the virtual wall may be performed by the virtual wall setter 234 of the main device controller 230 or may also be performed by the remote device controller 130.

Information on the virtual wall may be stored in the main device storage unit 240 or the remote device storage unit 140.

The method of controlling the cleaning robot 1 according to another embodiment may further include setting a virtual region in a case in which the main device 200 is present at the target point.

The virtual region may be automatically set to have a boundary spaced a preset reference distance apart from the divided region in which the main device 200 is present, or may also be manually set by the user.

The setting of the virtual region may be performed by the virtual region setter 236 of the main device controller 230 or may also be performed by the remote device controller 130.

Information on the virtual region may be stored in the main device storage unit 240 or the remote device storage unit 140.

Next, in the method of controlling the cleaning robot 1 according to one embodiment, the main device 200 is controlled to start cleaning (S2160).

The controlling of the main device 200 to start cleaning may include controlling the driving wheel driver 271 of the main device driver 270 by the cleaning controller 235 of the main device controller 230 to control the main device 200 to perform autonomous traveling, and controlling the main brush driver 272 and the side-brush driver 273 of the main device driver 270 by the cleaning controller 235 to control the main device 200 to perform cleaning while traveling.

The controlling of the main device 200 to start cleaning may also be performed by the remote device controller 130. In this case, control signals for respectively controlling the driving wheel driver 271, the main brush driver 272, and the side-brush driver 273 may be generated by the remote device controller 130 and transmitted to the driving wheel driver 271, the main brush driver 272, and the side-brush driver 273 via the remote device communication unit 120 and the main device communication unit 220.

The method of controlling the cleaning robot 1 may further include, in a case in which it is determined that cleaning is completed in the divided region selected by the user, stopping the cleaning performance, determining the next divided region, setting the target point in the next divided region, and generating the movement path.

The descriptions given above are merely exemplary descriptions of the technical spirit of the present disclosure, and one of ordinary skill in the art should be able to make various modifications, changes, and substitutions to the present disclosure within the scope not departing from the essential features of the present disclosure. Therefore, the embodiments disclosed above and the accompanying drawings are for describing the technical spirit of the present disclosure instead of limiting the same, and the scope of the technical spirit of the present disclosure is not limited by such embodiments and accompanying drawings. The scope of the technical spirit of the present disclosure should be interpreted from the claims below, and all technical spirits within the scope equivalent thereto should be construed as belonging to the scope of the present disclosure.

The invention claimed is:

1. A cleaning robot comprising:
   a user interface configured to display a map image including a plurality of divided regions, and receive, from a user, a selection of divided regions from the plurality of divided regions and a cleaning order of the selected divided regions, wherein the user interface displays an icon corresponding to a state value of a main device on the map image; and
   a controller configured to:
      when the cleaning order of the selected divided regions is received from the user through the user interface, control the main device to perform cleaning based on the received cleaning order;
      when the cleaning order of the selected divided regions is not received from the user through the user interface, control the main device to perform cleaning based on a predetermined cleaning order;
      in response to the main device being located in a first divided region among the selected divided regions, generate a virtual wall around the first divided region; and
      in response to the main device completing cleaning of the first divided region, remove the virtual wall and control the main device to move to a second divided region corresponding to a next order among the selected divided regions.

2. The cleaning robot of claim 1, wherein the state value includes any one of a first state value which indicates that the main device is performing cleaning, a second state value which indicates that the main device has completed cleaning, and a third state value which indicates that an error has occurred.

3. The cleaning robot of claim 1, wherein:
   the user interface receives a user command, and
   the controller controls the main device based on the user command.

4. The cleaning robot of claim 1, wherein the user interface receives a command to designate at least one divided region, and changes an outline display attribute of the designated at least one divided region.

5. The cleaning robot of claim 4, wherein, in a case in which the user interface receives the command to designate the at least one divided region, the user interface changes an outline color or an outline thickness of the designated at least one divided region.

6. The cleaning robot of claim 1, wherein, in a case in which the main device is traveling, the user interface displays a translucent layer over the map image.

7. The cleaning robot of claim 1, wherein, in a case in which the main device is traveling, the user interface displays an animation which indicates that the main device is traveling.

8. The cleaning robot of claim 1, wherein the user interface further displays a message corresponding to the state value of the main device.

9. The cleaning robot of claim 1, wherein the user interface receives a command to designate at least one divided region and changes a name display attribute of the designated at least one divided region.

10. The cleaning robot of claim 1, further comprising:
    a storage unit configured to store the map image.

11. The cleaning robot of claim 10, wherein:
    the storage unit includes information on a region dividing point corresponding to each divided region; and
    the controller sets the virtual wall at the region dividing point.

12. A method of controlling a cleaning robot, the method comprising:
    displaying a map image including a plurality of divided regions;
    displaying an icon corresponding to a state value of a main device on the map image;
    receiving, from a user, a selection of divided regions from the plurality of divided regions;

when a cleaning order of the selected divided regions is received from the user through a user interface, performing cleaning based on the received cleaning order;
when the cleaning order of the selected divided regions is not received from the user through the user interface, performing cleaning based on a predetermined cleaning order;
in response to the main device being located in a first divided region among the selected divided regions, generating a virtual wall around the first divided region; and
in response to the main device completing cleaning of the first divided region, removing the virtual wall and moving the main device to a second divided region corresponding to a next order among the selected divided regions.

13. The cleaning robot of claim 1, wherein the controller is further configured to:
set a target point within each of the selected divided regions as one of: a central point of the each of the selected divided regions, a point farthest from surrounding obstacles within the each of the selected divided regions, and a point within the each of the selected divided regions and closest to a current position of the main device; and
control the main device to perform cleaning from the target point of the each of the selected divided regions when cleaning the each of the selected divided regions.

14. The method of claim 12, further comprising:
setting a target point within each of the selected divided regions as one of: a central point of the each of the selected divided regions, a point farthest from surrounding obstacles within the each of the selected divided regions, and a point within the each of the selected divided regions and closest to a current position of the main device; and
performing cleaning from the target point of the each of the selected divided regions when cleaning the each of the selected divided regions.

* * * * *